US009444995B2

(12) United States Patent
Northrup et al.

(10) Patent No.: US 9,444,995 B2
(45) Date of Patent: Sep. 13, 2016

(54) SYSTEM AND METHOD FOR CONTROLLING A TRACKING AUTOFOCUS (TAF) SENSOR IN A MACHINE VISION INSPECTION SYSTEM

(71) Applicant: Mitutoyo Corporation, Kanagawa-ken (JP)

(72) Inventors: Ryan Northrup, Renton, WA (US); Dahai Yu, Redmond, WA (US); Hirato Sonobe, Miyazaki (JP)

(73) Assignee: Mitutoyo Corporation, Kanagawa-ken (JP)

( * ) Notice: Subject to any disclaimer, the term of this patent is extended or adjusted under 35 U.S.C. 154(b) by 246 days.

(21) Appl. No.: 14/052,579

(22) Filed: Oct. 11, 2013

(65) Prior Publication Data
US 2015/0103156 A1 Apr. 16, 2015

(51) Int. Cl.
*H04N 5/232* (2006.01)
*G02B 21/36* (2006.01)
*G02B 21/24* (2006.01)
*G01B 9/04* (2006.01)
*G01B 11/00* (2006.01)

(52) U.S. Cl.
CPC ............ *H04N 5/23216* (2013.01); *G01B 9/04* (2013.01); *G01B 11/005* (2013.01); *G02B 21/244* (2013.01); *G02B 21/365* (2013.01)

(58) Field of Classification Search
CPC ......................... H04N 5/23216; G02B 21/365
USPC .......................................................... 348/79
See application file for complete search history.

(56) References Cited

U.S. PATENT DOCUMENTS

| | | |
|---|---|---|
| 4,336,997 A | 6/1982 | Ross et al. |
| 4,950,878 A | 8/1990 | Ulich et al. |
| 6,542,180 B1 | 4/2003 | Wasserman et al. |
| 6,640,014 B1 | 10/2003 | Price et al. |
| 7,301,133 B2 | 11/2007 | Weiss |
| 7,324,682 B2 | 1/2008 | Wasserman |
| 7,454,053 B2 | 11/2008 | Bryll et al. |
| 7,723,657 B2 | 5/2010 | Altendorf et al. |

(Continued)

OTHER PUBLICATIONS

"QVPAK 3D CNC Vision Measuring Machine Operation Guide," Version 2.0, published Sep. 1996, 86 pages.

(Continued)

*Primary Examiner* — Christopher S Kelley
*Assistant Examiner* — Zhihan Zhou
(74) *Attorney, Agent, or Firm* — Seed IP Law Group PLLC

(57) ABSTRACT

A method is provided for controlling a Tracking AutoFocus (TAF) portion of a machine vision inspection system including an imaging portion, a movable workpiece stage, a control portion, and graphical user interface (GUI). The TAF portion automatically adjusts a focus position of the imaging portion to focus at a Z height corresponding to a current surface height of the workpiece. The method includes providing the TAF portion, and providing TAF enable and disable operations, wherein: the TAF disable operations comprise a first set of TAF automatic interrupt operations that are automatically triggered by user-initiated operations that include changing the Z height, and the TAF disable operations may further comprise automatic interrupt operations that are automatically triggered based on at least one respective TAF Z height surface tracking characteristic exceeding a previously set TAF disable limit for that respective TAF Z height surface tracking characteristic.

24 Claims, 14 Drawing Sheets

(56) References Cited

U.S. PATENT DOCUMENTS

| | | |
|---|---|---|
| 7,728,961 B2 | 6/2010 | Watson |
| 8,111,905 B2 | 2/2012 | Campbell |
| 8,111,938 B2 | 2/2012 | Bryll et al. |
| 8,271,895 B2 | 9/2012 | Tseo et al. |
| 8,412,035 B2 | 4/2013 | Ogino |
| 2006/0202103 A1* | 9/2006 | Weiss ............... G02B 7/282 250/201.2 |
| 2008/0100829 A1* | 5/2008 | Watson ............ G01B 11/0608 356/123 |
| 2008/0195960 A1* | 8/2008 | Bostock ......... G06F 17/30899 715/767 |
| 2010/0158343 A1* | 6/2010 | Bryll ................... G02B 7/36 382/141 |
| 2011/0231787 A1* | 9/2011 | Tseo ................. G05B 19/409 715/771 |
| 2011/0309231 A1* | 12/2011 | Cooper ............. G02B 21/245 250/201.2 |
| 2013/0083180 A1* | 4/2013 | Sasaki .............. H04N 5/23212 348/65 |

OTHER PUBLICATIONS

"QVPAK 3D CNC Vision Measuring Machine User's Guide," Version 7, published Jan. 2003, 329 pages.

* cited by examiner

SYSTEM AND METHOD FOR CONTROLLING A TRACKING AUTOFOCUS (TAF) SENSOR IN A MACHINE VISION INSPECTION SYSTEM

TECHNICAL FIELD

The invention relates generally to machine vision inspection systems, and more particularly to systems and computer-implemented methods for controlling a Tracking AutoFocus (TAF) sensor in a machine vision inspection system.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision workstage that is movable in multiple directions to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This series of products, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface (GUI), or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) and other GUI features may be set up manually to accomplish inspection and/or other machine control operations. Video tools' set-up parameters and operations can also be recorded during learn mode, in order to create automatic inspection programs, or "part programs," which incorporate measurement/analytical operations to be performed by various video tools. Video tools may include, for example, edge/boundary detection tools, autofocus tools, shape or pattern matching tools, dimension measuring tools, and the like. Other GUI features may include dialog boxes related to data analysis, step and repeat loop programming—as disclosed, for example, in U.S. Pat. No. 8,271,895, which is incorporated herein by reference in its entirety—etc. For example, such tools and GUI features are routinely used in a variety of commercially available machine vision inspection systems, such as the QUICK VISION® series of vision systems and the associated QVPAK® software, discussed above.

Machine vision inspection systems are known to incorporate various types of focus measurement in automated video inspection, for controlling continuous auto focus and/or for making surface height measurements. Generally there are two types of focus measurement: image-based focus measurement and signal-based focus measurement. The image-based focus measurement is based on analysis of the contrast in acquired images. For a given field of view, the highest contrast image generally corresponds to the best focused image. A surface height measurement may be inferred from the best focused image position, since the camera-object distance corresponding to any image is generally known in machine vision inspection systems.

The signal-based focus measurement is based on the use of an auxiliary focus sensor that does not rely on the images of the machine vision inspection system for determining the best focus position or surface height. Various types of auxiliary focus sensors are known, including triangulation sensors, knife edge focus sensors, chromatic confocal sensors, Shack-Hartmann type wavefront sensors, etc., as described in U.S. Pat. Nos. 4,336,997, 4,950,878, 6,184,974, 7,301,133, 7,723,657 and 7,728,961, which are incorporated by reference herein. Generally, auxiliary focus sensors perform focus measurement by receiving optical signals from an object, converting them to electrical signals, and comparing them with a reference signal corresponding to the best focus (zero) position or a workpiece (object) surface height. Thus, by determining that an obtained electrical signal is above or below the reference signal by how much, it can be determined that an image is out of focus in a positive (+) or a negative (−) direction by how much along the optical (e.g., vertical) axis relative to the best focus (zero) position of the object lens. Typically, the signal-based focus measurement is faster than the image-based focus measurement and thus is suited for application in a Tracking AutoFocus (TAF) sensor that is configured to continuously and automatically maintain focus in a vision system in real time.

The present invention is directed to providing an improved system, GUI and computer-implemented method for controlling a TAF sensor in a machine vision inspection system.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various embodiments, a method is provided for controlling operation of a Tracking AutoFocus (TAF) portion of a machine vision inspection system including an imaging portion, a movable stage for holding one or more workpieces in a field of view of the imaging portion, a control portion, and graphical user interface (GUI). The TAF portion operates to automatically adjust a focus position of the imaging portion to focus at a Z height corresponding to a current surface height of the workpiece in the field of view. The method includes step (A) of providing the TAF portion, which includes a focus sensor and a motion control portion that is responsive to a focus signal derived from the focus sensor to focus the imaging portion at the Z height corresponding to the current surface height, when TAF is enabled. The method also includes step (B) of providing TAF enable and disable operations, wherein: (B1) the TAF disable operations include a first set of TAF automatic interrupt operations that are automatically triggered by user-initiated operations that include changing the Z height. For example, when a user performs an explicit Z height adjustment operation to move the imaging portion relative to the movable stage along the Z axis, this triggers the first set of TAF automatic interrupt operations to, for example, disable the TAF portion, i.e., to terminate TAF adjustments of the Z height ("TAF disabled mode"). In various embodiments, once the first set of TAF automatic interrupt operations is triggered to disable the TAF portion, there are no conditions under which the TAF portion automatically resumes Z height adjustments without a user-initiated instruction which restarts TAF Z height control operations. The first set of TAF automatic interrupt operations are useful because user-initiated operations that include changing the Z height may likely exceed the TAF portion's capability to automatically adjust to the new, user-defined Z height to continue maintaining focus at that new Z height.

In some embodiments, in addition to the first set of TAF automatic interrupt operations described above, (B2) the TAF disable operations may further comprise a second set of TAF automatic interrupt operations that are automatically triggered based on at least one respective TAF Z height surface tracking characteristic exceeding a previously set TAF disable limit for that respective TAF Z height surface tracking characteristic. For example, the at least one respective TAF Z height surface tracking characteristic may be the Z height as controlled by the TAF portion, and the previously set TAF disable limit for that TAF Z height surface tracking characteristic may be an relative Z height limit defined relative to a current baseline Z height. More generally, in various embodiments the at least one respective TAF Z height surface tracking characteristic may comprise at least one of a) the Z height as controlled by the TAF portion, b) the rate of change of the Z height as a function of time, and c) the rate of change of the Z height as a function of distance along an X-Y direction, d) a surface tracking error comprising a difference between the current Z height at a current XY position and an indication of the required TAF focus Z height at the current XY position, and e) a TAF deviation signal that is indicative of a difference between the current Z height at a current XY position and the required TAF focus Z height at the current XY position, and the previously set TAF disable limit for that TAF Z height surface tracking characteristic may comprise at least one of f) an absolute Z height limit, g) a relative Z height limit defined relative to a current baseline Z height of the TAF portion, h) a limit on the rate of change of the Z height as a function of time, i) a limit on the rate of change of the Z height as a function of distance along an X-Y direction, j) a limit on the surface tracking error, and k) a limit on the TAF deviation signal. In this connection, a TAF disable limit definition element may be provided in the GUI to permit a user to define the previously set TAF disable limit. When a user sets the relative Z height limit as +0.4 mm and −0.2 mm, for example, and when the Z height measured by the TAF portion becomes more than 0.4 mm higher than, or more than 0.2 mm lower than, the baseline Z height, this triggers the second set of TAF automatic interrupt operations. In various embodiments, the second set of TAF automatic interrupt operations include a TAF holding mode, wherein the TAF adjustments of the height are discontinued but, if the TAF Z height surface tracking characteristic returns below the previously set TAF disable limit during the TAF holding mode, then TAF Z height adjustments are automatically resumed without a user-initiated instruction. Continuing the above-described example, after the vision inspection system enters into TAF holding mode upon detecting the Z height that exceeds the relative Z height limit, when it is detected that the relative Z height returns below the relative Z height limit during the TAF holding mode, then TAF Z height adjustments are automatically resumed without a user-initiated instruction.

The second set of TAF automatic interrupt operations including TAF holding mode are useful, for example, when the vision inspection system is used to inspect a workpiece including holes or bosses, wherein oftentimes what needs to be inspected is an edge of each hole or a boss, as opposed to the bottom surface of each hole or the top surface of the boss. Then, it is useful to suspend operation of the TAF portion in the hole, or on the boss, to maintain focus at the edges. Specifically, if the TAF portion remains enabled after it traverses a first edge of a hole (i.e., a falling edge), the TAF portion operates to attempt to focus the imaging portion at the bottom surface of the hole which enters the field of view, and when it next traverses a second edge of the same hole (i.e., a rising edge), the TAF portion must quickly adjust the focus back to the original surface height in order to obtain a well-focused image of the top/rising edge. However, this may be difficult to achieve in a timely manner, especially when the hole is deep or when the hardware (e.g., a camera system) that needs to be moved to effect the adjustment is massive. The second set of TAF automatic interrupt operations including the TAF holding mode are useful in allowing to selectively suspend or hold operation of the TAF portion so as to maintain focus on the edges of interest, and maintain high throughput, especially at large surface discontinuities at edges found in a workpiece.

According to another aspect of the inventions, the GUI of the machine vision inspection system includes a part program editing window including part program instruction representations displayed during learn mode operations of the machine vision inspections system. A user may program various TAF related operations, including TAF enable and disable operations, in the part program editing window.

In accordance with further embodiments, a computer-readable non-transitory medium is provided, which includes computer-executable instructions configured to be loaded onto a computer to control a machine vision inspection system. The machine vision inspection system includes an imaging portion; a movable stage for holding one or more workpieces in a field of view of the imaging portion; and a Tracking AutoFocus (TAF) portion that operates to automatically adjust a focus position of the imaging portion to focus at a Z height corresponding to a current surface height of the workpiece in the field of view. The TAF portion includes a focus sensor and a motion control portion that is responsive to a focus signal derived from the focus sensor to focus the imaging portion at the Z height corresponding to the current surface height, when TAF is enabled. The machine vision inspection system further includes a graphical user interface (GUI). The GUI under control of the computer-executable instructions operates to display instruction representations corresponding to TAF enable and disable operations in a part program editing window including part program instruction representations displayed during learn mode operations of the machine vision inspection system. The TAF disable operations include a first set of TAF automatic interrupt operations that are automatically triggered by user-initiated operations that include changing the Z height.

In accordance with still further embodiments, a machine vision inspection system is provided including an imaging portion, a movable stage for holding one or more workpieces in a field of view of the imaging portion, a control portion, and a Tracking AutoFocus (TAF) portion that operates to automatically adjust a focus position of the imaging portion to focus at a Z height corresponding to a current surface height of the workpiece in the field of view. The TAF portion includes a focus sensor and a motion control portion that is responsive to a focus signal derived from the focus sensor to focus the imaging portion at the Z height corresponding to the current surface height, when TAF is enabled. The machine vision inspection system further includes a graphical user interface (GUI). The control portion of the machine vision inspection system is configured to provide TAF enable and disable operations, wherein the TAF disable operations include a first set of TAF automatic interrupt operations that are automatically triggered by user-initiated operations that include changing the Z height.

DETAILED DESCRIPTION

Figure 1A:
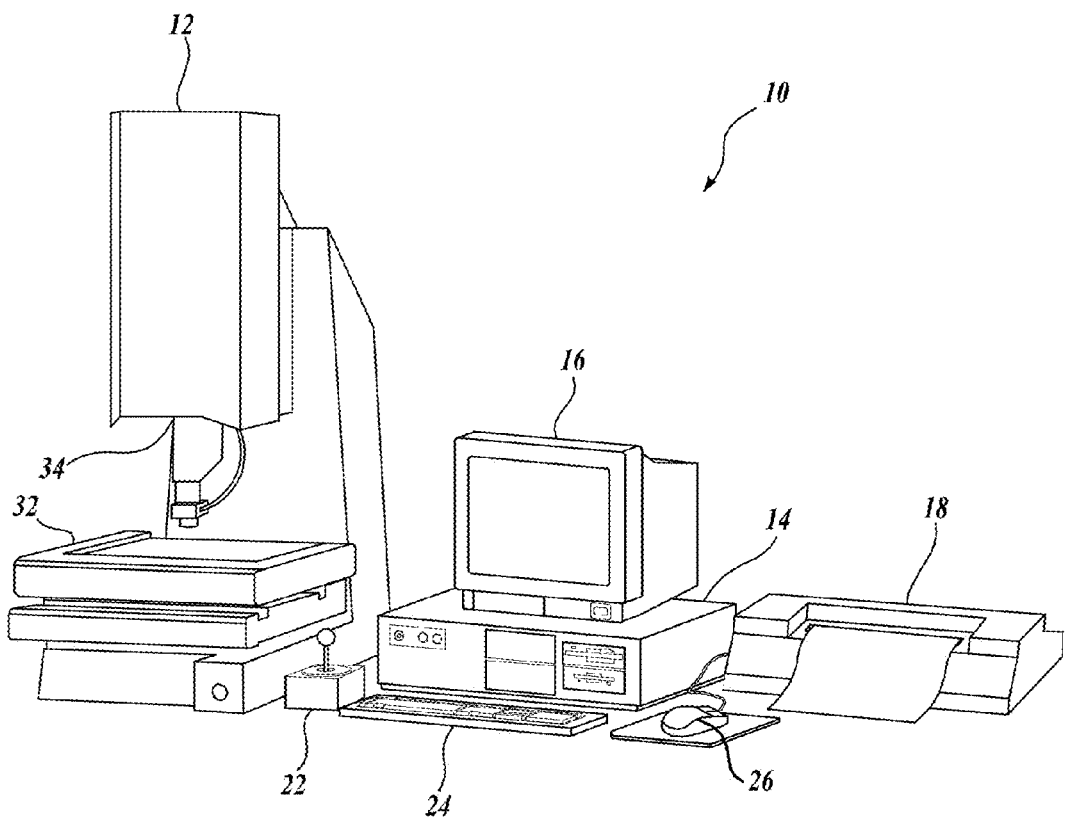
FIG. 1A is a diagram showing various typical components of a general purpose precision machine vision inspection system.

FIG. 1A is a block diagram of one exemplary machine vision inspection system 10 usable in various embodiments of the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10, such as a GUI for programming and monitoring TAF enable and TAF disable operations in the vision system 10 according to various embodiments of the present invention.

The vision measuring machine 12 includes a moveable workpiece stage 32, and an optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053, 7,324,682, 8,111,938, and 8,111,905, which are each incorporated herein by reference.

Figure 1B:
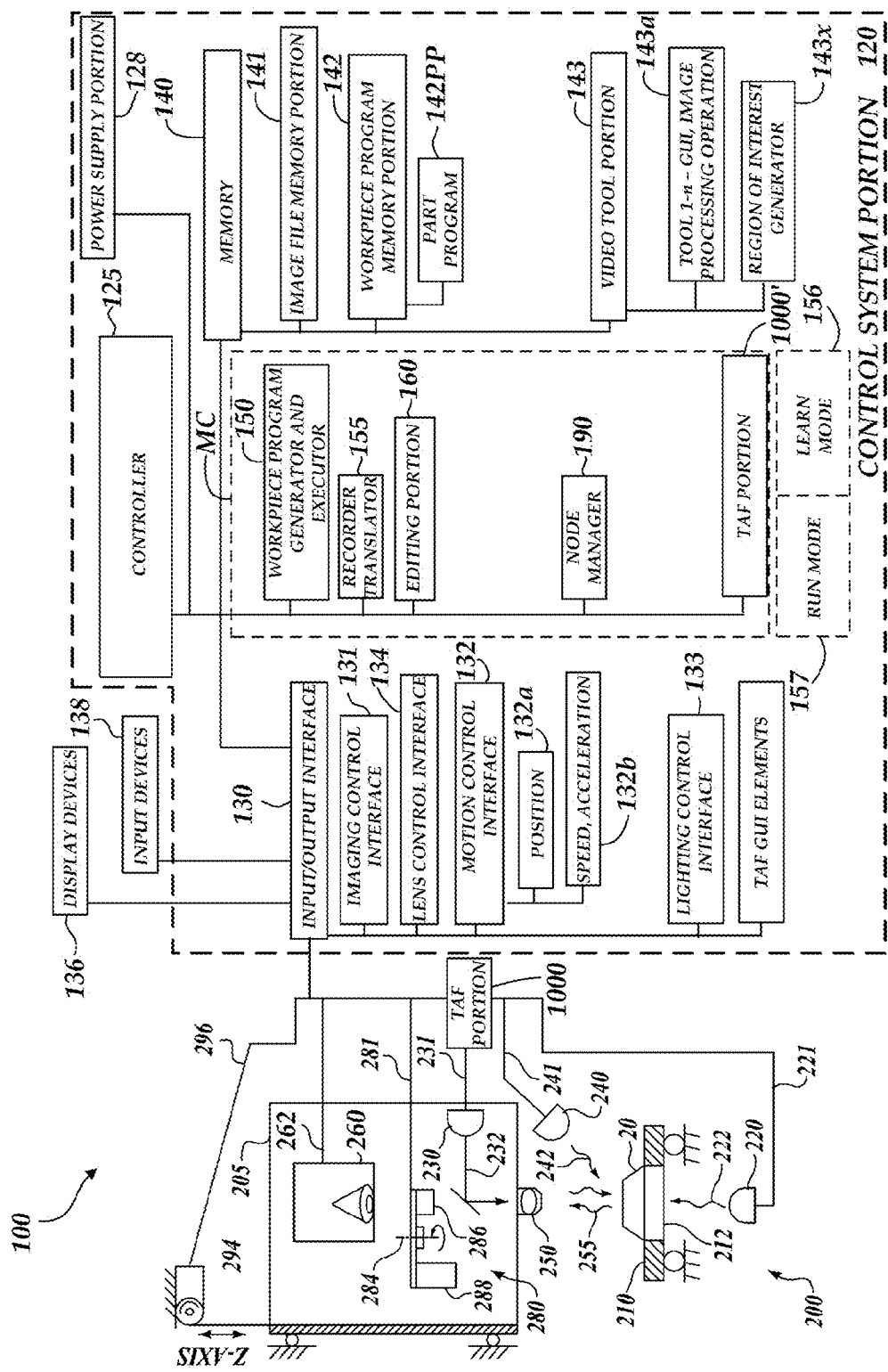
FIGS. 1B and 1C are block diagrams of a control system portion and a vision components portion of a machine vision inspection system similar to that of FIG. 1A, including modules and features usable in various embodiments according to this invention.
Figure 1C:
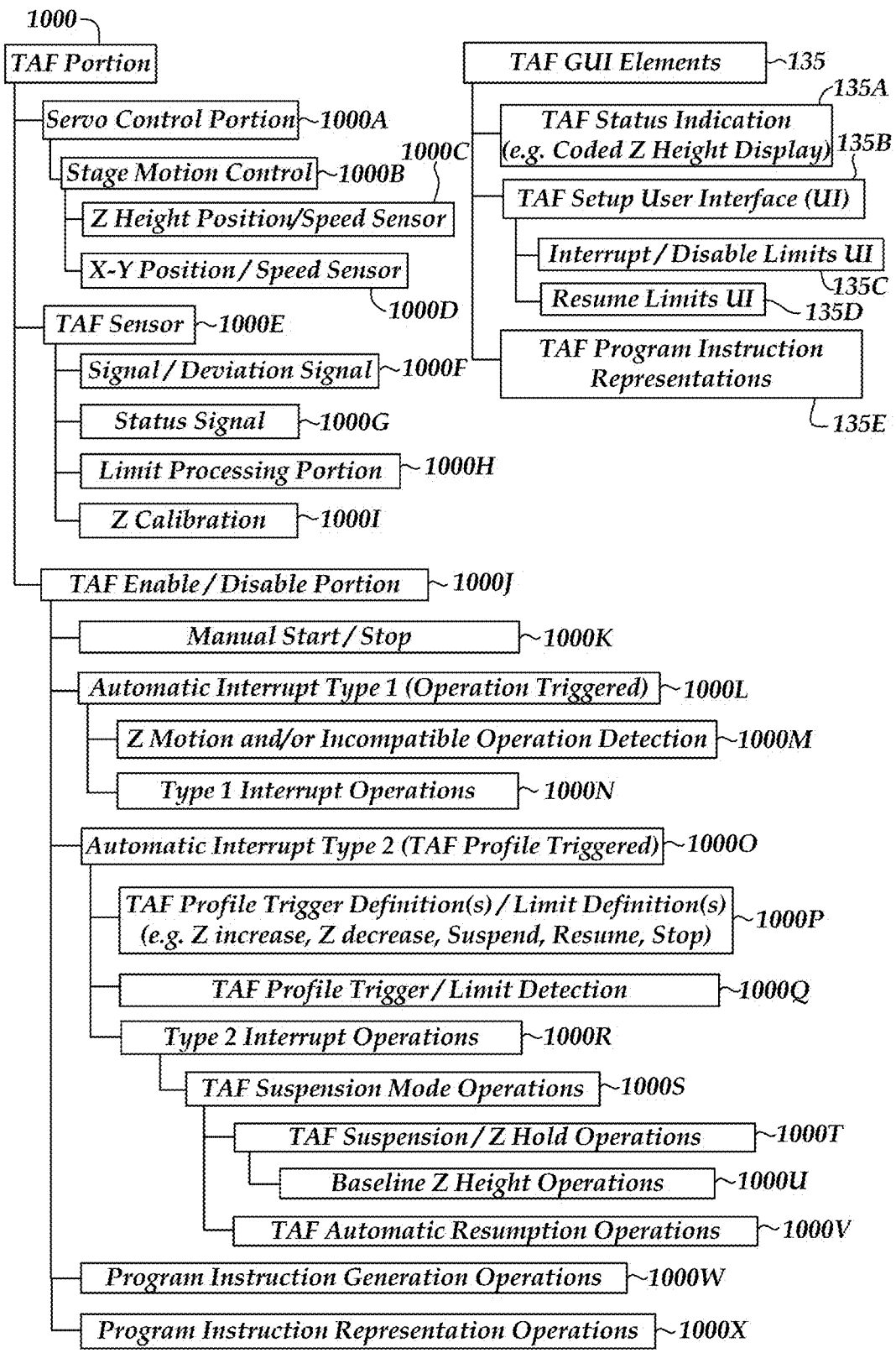

FIGS. 1B and 1C are block diagrams of a control system portion 120 and a vision components portion 200 of a machine vision inspection system 100 similar to the machine vision inspection system 10 of FIG. 1A. The control system portion 120 is utilized to control the vision components portion 200 and includes features usable in various embodiments according to the present invention. As shown in FIG. 1B, the vision components portion 200 includes an imaging portion 205, light sources 220, 230 and 240, part or a whole of a TAF portion 1000 (which may instead reside in the control system portion 120, as will be more fully described below), and a workpiece stage 210 having a central transparent portion 212. The workpiece stage 210 is controllably movable along X and Y axes that lie in a plane that is generally parallel to the surface of the stage on which a workpiece 20 may be positioned. The imaging portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. The imaging portion 205 is controllably movable along a Z-axis that is generally orthogonal to the X and Y axes, by using a controllable motor 294.

A workpiece 20, or a tray or fixture holding a plurality of workpieces 20, which is to be imaged using the machine vision inspection system 100, is placed on the workpiece stage 210. The workpiece stage 210 may be controlled to move relative to the imaging portion 205, such that the objective lens 250 moves between locations on a workpiece 20 and/or among a plurality of workpieces 20. One or more of a stage light 220, a coaxial light 230, and a surface light 240 may emit source light 222, 232, or 242, respectively, to illuminate the workpiece or workpieces 20. The source light is reflected or transmitted as workpiece light 255, which passes through the objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

In various exemplary embodiments, the imaging portion 205 is movable in the vertical Z-axis direction relative to the workpiece stage 210 using a controllable motor 294 that drives an actuator, a connecting cable, or the like, to move the imaging portion 205 along the Z-axis to change the focus of the image of the workpiece 20 captured by the camera system 260. The term Z-axis, as used herein, refers to the axis that is intended to be used for focusing the image obtained by the imaging portion 205. The controllable motor 294 is connected to the input/output interface 130 via a signal line 296.

Figure 1D:
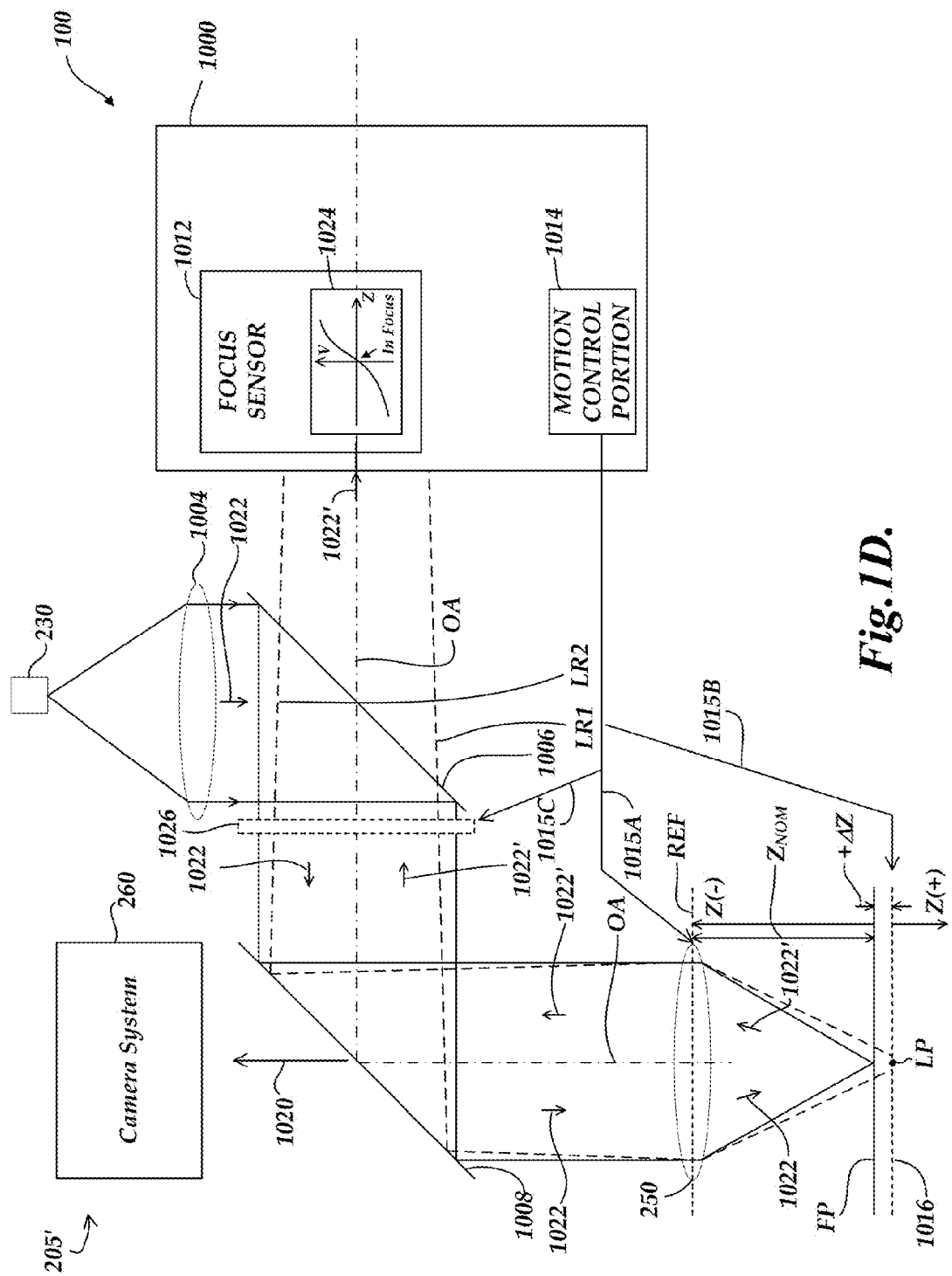
FIG. 1D is a diagram of an example Tracking AutoFocus (TAF) assembly integrated in a machine vision inspection system of FIG. 1A.

FIG. 1D is a diagram of an example TAF assembly, including a TAF portion 1000, the illumination source 230, and the imaging portion 205', which may be incorporated in the machine vision inspection system of FIG. 1A. As will be apparent to those skilled in the art, the imaging portion 205' of FIG. 1D is one example of the imaging portion 205 described above in reference to FIG. 1B, and shares some of the same elements such as the camera system 260 and the objective lens 250, while being specifically configured to suitably incorporate the TAF portion 1000 in the machine vision inspection system 100. The TAF portion 1000 includes a focus sensor 1012 and a motion control portion 1014 that is responsive to a focus signal derived from the focus sensor 1012 to focus the imaging portion 205' at the height corresponding to the current surface height 1016 of a workpiece being imaged. The imaging portion 205' includes a collimation lens 1004, a first beamsplitting surface 1006, a second beamsplitting surface 1008, the objective lens 250, a nominal focus plane FP of the objective lens 250, and the camera system 260.

The motion control portion 1014 is configured to make automatic adjustment necessary to align the nominal focus plane FP of the objective lens 250 with the workpiece surface 1016, so as to maintain focus for the imaging portion 205', based on the focus signal derived from the focus sensor 1012. In FIG. 1D, the objective lens 250 provides a workpiece inspection image via image light 1020 transmitted through the second beamsplitting surface 1008 to the camera system 260. The objective lens 250 also provides a reflected beam 1022' to be reflected from the second beamsplitting surface 1008 along the optical axis OA of the TAF portion 1000 toward the focus sensor 1012. In operation, radiation from the illumination source 230 is input to collimation lens 1004, which outputs an illumination beam 1022 to the first beamsplitting surface 1006, which outputs (and deflects) it to be input to the second beamsplitting surface 1008, which outputs (and deflects) it to the objective lens 250. The objective lens 250 inputs the illumination beam 1022 and focuses it at the nominal focus plane FP along the optical axis OA. The nominal focus plane FP is located at a distance ZNOM from a reference plane REF that is fixed relative to the objective lens 250.

The workpiece surface 1016 may be located along the optical axis OA at a sensed distance ZNOM+ΔZ, as shown in FIG. 1D. The workpiece surface 1016 reflects the focused illumination beam 1022 to provide a reflected beam 1022'. The objective lens 250 receives and transmits the reflected beam 1022'. The transmitted reflected beam 1022' is then input to the second beamsplitting surface 1008, which outputs (and deflects) it to the first beamsplitting surface 1006, which outputs it along the optical axis OA to be input to the focus sensor 1012.

The focus sensor 1012 may be based on any of the various auxiliary focus sensor techniques described above, such as the knife edge focus technique, chromatic confocal technique, and Shack-Hartmann type of wavefront sensing technique. The focus sensor 1012 is capable of receiving optical signals (e.g., the transmitted reflected beam 1022') from the object (i.e., the workpiece surface 1016) and converting them to electrical signals (e.g., in voltage V), and comparing them with a reference signal corresponding to the best focus (zero) position or surface height corresponding to the nominal focus plane FP, as shown in a graph 1024 for example. Specifically, when V is determined to be positive or negative, the workpiece surface 1016 generating the reflected beam 1022' is determined to be at a distance +ΔZ away from the objective lens 250, or at a distance −ΔZ closer to the objective lens 250, relative to the nominal focus plane FP. In the example of FIG. 1D, the workpiece surface 1016 is illustrated at a position that is separated by +ΔZ from the focus plane FP in the Z positive direction. Based on the focus signal derived from the focus sensor 1012, the motion control portion 1014 may make necessary adjustment to focus the imaging portion 205' at the Z height corresponding to the current surface height 1016. To that end, in the illustrated example, the motion control portion 1014 may move the objective lens 250 by +ΔZ in the Z positive direction along the optical axis, may move a workpiece stage (not shown) supporting the workpiece surface 1016 by −ΔZ in the Z negative direction along the optical axis, or may move both the objective lens 250 and the workpiece stage supporting the workpiece surface 1016 so as to align the nominal focus plane FP with the workpiece surface 1016. In this connection, the motion control portion 1014 may control the controllable motor 294 (see FIG. 1B) to actuate the objective lens 250 and/or control a suitable linear actuator and a linear encoder to focus the imaging portion 205' at the current surface height 1016.

In yet another example, the imaging portion 205' may further include a collimation adjustment element 1026, and the motion control portion 1014 may control the collimation adjustment element 1026, based on the focus signal derived from the focus sensor 1012, to provide an amount of collimation adjustment to the illumination beam 1022 so as to focus the imaging portion 205' at the Z height corresponding to the current surface height 1016. The collimation adjustment element 1026 may be a variable focus lens that is electronically adjustable, and may be provided between the first beamsplitting surface 1006 and the second beamsplitting surface 1008.

In various embodiments, the TAF portion 1000 is configured to apply a laser beam point (LP) at a current XY position of the current Z height, so that an operator can visually verify the current XY position that the TAF portion 10000 is tracking. To that end, a suitable laser beam source (not shown) is arranged.

As shown in FIG. 1B, the TAF portion 1000 may be fully or partially included in the vision components portion 200, or may be fully or partially included in the control system portion 120 (see 1000'). The TAF portion 1000 may be partially included in the vision components portion 200, for example, when only the focus sensor 1012 is included in the vision components portion 200 while the motion control portion 1014 is included in the control system portion 120. As will be apparent to those skilled in the art, various operations regarding the TAF portion 1000 may be implemented by hardware configuration, software configuration, or a combination of hardware and software configuration and, therefore, various hardware and/or software components and features of the TAF portion 1000 may be suitably arranged between the vision components portion 200 and the control system portion 120 of the machine vision inspection system 100, depending on each implementation.

Still referring to FIG. 1B, in various exemplary embodiments, the control system portion 120 includes a controller 125, a power supply portion 128, an input/output interface 130, a memory 140, a workpiece program (part program) generator and executor 150, a recorder translator 155, a learn mode executor 156, a run mode executor 157, an editing portion 160, a node manager 190, and part or a whole of the TAF portion 1000'. Each of these components, as well as the additional components described below, may be interconnected by one or more data/control buses and/or application programming interfaces, or by direct connections between the various elements. As apparent to those skilled in the art, any of these components may be merged together, may consist of multiple sub-components, or any of their respective sub-components may be merged together, depending on each implementation.

The input/output interface 130 includes an imaging control interface 131, a motion control interface 132, a lighting control interface 133, a lens control interface 134, and TAF GUI elements 135. The TAF GUI elements 135 are responsible for providing GUI for controlling and programming TAF operations such as TAF enable and TAF disable operations according to various embodiments of the present invention. The motion control interface 132 may include a position control element 132a, and a speed/acceleration control element 132b, although such elements may be merged and/or indistinguishable. The lighting control interface 133 controls, for example, the selection, power (intensity), on/off switch, and strobe pulse timing if applicable, for the various corresponding light sources of the machine vision inspection system 100.

The memory 140 includes an image file memory portion 141, a workpiece program memory portion 142 that may include one or more part programs 142PP, and a video tool portion 143. The video tool portion 143 includes various video tools (collectively 143a) each including the GUI and image processing operation defined to perform a specific function, such as edge/boundary detection tools, image-based autofocus tools, shape or pattern matching tools (e.g., circle tools and box tools) and dimension measuring tools. Many known video tools are included in commercially available machine vision inspection systems, such as the QUICK VISION® series of vision systems and the associated QVPAK® software discussed above. The video tool portion 143 also includes a region of interest (ROI) generator 143x that supports automatic, semi-automatic and/or manual operations that define various ROIs that are operable in various video tools included in the video tool portion 143.

In general, the memory portion 140 stores data usable to operate the machine vision inspection system 100 to acquire an image of the workpiece 20 such that the acquired image has desired image characteristics. The memory portion 140 may further store data usable to operate the machine vision inspection system 100 to perform various inspection and measurement operations on the acquired image (e.g., implemented, in part, as video tools) and to output the measurement results through the input/output interface 130. The memory portion 140 may also contain data defining a graphical user interface (GUI) operable through the input/output interface 130.

The signal lines or busses 221, 231 and 241 of the stage light 220, the coaxial light 230, and the surface light 240, respectively, are all connected to the input/output interface 130. The signal line 262 of the camera system 260 and the signal line 296 of the controllable motor 294 are connected to the input/output interface 130. Referring additionally to FIG. 1D, signal lines 1015A, 1015B, and 1015C, for controlling the Z height of the objective lens 250, the Z height of the workpiece stage 210, and the variable focus of the collimation adjustment element 1026, respectively, to focus the imaging portion 205' at the current Z surface height 1016 may also be connected to the input/output interface 130 if the TAF motion control portion 1014 is included in the control system portion 120. In addition, a signal input line into the TAF focus sensor 1012 may be connected to the input/output interface 130 if the focus sensor 1012 is included in the control system portion 120.

One or more display devices 136 (e.g., the display 16 of FIG. 1A) and one or more input devices 138 (e.g., the joystick 22, keyboard 24, and mouse 26 of FIG. 1A) can also be connected to the input/output interface 130. The display devices 136 and input devices 138 can be used to display a GUI, which may include various user interface features usable to create and/or edit part programs including TAF enable and disable operations, to monitor operation of the TAF portion 1000, to view the images captured by the camera system 260, and/or to directly control various components of the vision system components portion 200.

The workpiece program (or part program) generator and executor 150, recorder translator 155, learn mode executor 156, run mode executor 157, editing portion 160, node manager 190, and TAF portion 1000' may be considered to be part of a general machine controller block MC that is linked to the controller 125. The workpiece program generator and executor 150 is responsible for creating and executing part programs (or "workpiece programs"). Based on the operations of the workpiece program generator and executor 150, a user utilizes the machine vision inspection system 100 to create a part program for the workpiece 20, either by explicitly coding the instructions automatically, semi-automatically, or manually, using a workpiece programming language, and/or by generating the instructions by operating the machine vision inspection system 100 in a learn mode (e.g., as controlled by the learn mode executor 156) to provide a desired image acquisition training sequence. For example, a training sequence may comprise positioning a workpiece feature in the field of view (FOV), setting light levels, focusing or autofocusing, acquiring an image, and providing an inspection training sequence applied to the image (e.g., using video tools). The learn mode operates such that the "learned" operation sequence(s) are recorded and converted to corresponding part program steps (i.e., instructions). These part program steps, when the part program is executed in a run mode (e.g., as controlled by the run mode executor 157), will cause the machine vision inspection system 100 to reproduce the trained image acquisition and inspection operations to automatically inspect a workpiece or workpieces matching the workpiece used when creating the part program.

The recorder translator 155 is utilized for translating machine operations into part program code. In other words, if a user performs an action (e.g., such as manually changing the Z height corresponding to the current surface height), a basic instruction is generated that is translated into a machine readable language to form a part program, and a reverse translation may also be performed. In various embodiments of the present invention, user-initiated operations that include changing the Z height in learn mode of operation are translated into part program code corresponding to editable instruction representations of disabling the TAF portion 1000, wherein such instruction representations (e.g., "Turn TAF Off") may be displayed on a part program editing window GUI. The recorder translator 155 may perform translation between the editable instruction representations and their corresponding code instructions. The editing portion 160 provides or activates various operations and user interface features related to editing a part program. In one embodiment, the node manager 190 is responsible for managing node numbers that are assigned to nodes in a part program. In one implementation, within a representation of a part program, each of the instruction representations is assigned a node number. In certain implementations, an organizational tree structure may be utilized that includes parent nodes and child nodes. In certain implementations, every line of a part program representation that is generated by the recorder translator 155 is assigned a node number by the node manager 190. The node numbers controlled by the node manager 190 may be used, for example, to arrange the part program instruction representations including TAF enable and disable operations in a defined order, according to various embodiments of the present invention as will be described below.

The TAF portion 1000 provides or activates various operations and user interface features, such as those captured in the TAF GUI elements 135, related to TAF functionality in a machine vision inspection system 100. FIG. 1C illustrates one example configuration of the TAF portion 1000 and the TAF GUI elements 135 according to some embodiments of the present application. The TAF portion 1000 includes a servo control portion 1000A including a stage motion control 1000B, which in turn includes a Z height position/speed sensor 1000C and a X-Y position/speed sensor 1000D. The TAF portion 1000 also includes a TAF sensor 1000E, which includes a signal/deviation signal portion 1000F, a status signal portion 1000G, a limit processing portion 1000H, and a Z calibration portion 1000I. In general, the servo control portion 1000A corresponds to the motion control portion 1014 of FIG. 1D, and is configured to focus the imaging portion 205 at the Z height corresponding to the current surface height in response to a focus signal derived from the TAF sensor 1000E, which corresponds to the focus sensor 1012 of FIG. 1D. Specifically, based on the focus signal derived from the TAF sensor 1000E, the servo control portion 1000A may actuate the imaging portion 205 and/or the workpiece stage 210. In the illustrated embodiment, the servo control portion 1000A may actuate the workpiece stage 210 using the stage motion control 10008, in reference to feedback signals received from the Z height position/speed sensor 1000C and the X-Y position/speed sensor 1000D, which are respectively indicative of where the current Z height is and how fast the current Z height is changing and where the current X-Y position is and how fast the current X-Y position is changing.

The TAF sensor 1000E is configured to generate electrical signals (e.g., in voltage V) that are indicative of a current focus status relative to a reference signal corresponding to the best focus (e.g., V=0) position, as schematically shown in the graph 1024 in FIG. 1D. V can be converted to a corresponding current Z height such that, for example, when V is determined to be positive or negative, the current Z height at a current XY position is determined to be different by $+\Delta Z$ or $-\Delta Z$ relative to the required TAF focus Z height at the current XY position. The signal/deviation signal portion 1000F of the TAF sensor 1000E is configured to generate a surface tracking error signal, such as in voltage V, which includes a difference between the current Z height at a current XY position and an indication of the required TAF focus Z height at the current XY position. Alternatively or additionally, the signal/deviation signal portion 1000F may generate a TAF deviation signal, such as in $+\Delta Z$ or $-\Delta Z$, which is indicative of the difference between the current Z height at a current XY position and the required TAF focus Z height at the current XY position.

The status signal portion 1000G of the TAF sensor 1000E is configured to generate signals indicative of different states or operation modes of TAF, at least some of which may be entered into based on the surface tracking error or TAF deviation signal generated by the signal/deviation signal portion 1000F in various embodiments. For example, according to various exemplary embodiments of the present invention, a second set of TAF automatic interrupt operations including TAF holding mode are automatically triggered based on a TAF Z height surface tracking characteristic (e.g., a surface tracking error) exceeding a previously set TAF disable limit. As used herein, the holding mode means a TAF operation mode, in which TAF is on but is suspended, such that the signal/deviation signal portion 1000F is generating a focus signal (e.g., a surface tracking error signal in V) but the focus signal is not used by the servo control portion 1000A to focus the imaging portion 205 at the Z height corresponding to the current surface height. That is, TAF Z height adjustments are suspended and not performed during the holding mode. If the TAF portion 1000 is configured to apply a laser beam point (LP) at its focus-tracked XY position (see FIG. 1D), the LP is on during the holding mode (because a surface tracking error signal is generated) but no active control of the Z height to maintain auto focus is performed. According to embodiments of the present invention, the status signal portion 1000G generates signals indicative of at least three different states of TAF: TAF enabled or on, TAF disabled or off, and TAF suspended or holding mode. The TAF enabled or on mode means that TAF is on and is actively controlling the Z height to maintain focus, and the laser beam point (LP) is visible. The TAF disabled or off mode means that TAF is off and is not actively controlling the Z height to maintain focus, and not even generating a surface tracking error signal and the laser beam point (LP) is off. In various embodiments of the present invention, user-initiated operations that include changing the Z height of the machine vision inspection system 100 automatically trigger the TAF disabled or off mode. The status signals generated by the status signal portion 1000G are used to control the status message and its color as displayed on the GUI to inform an operator of the current operation state (or mode) of the TAF portion 1000.

The limit processing portion 1000H of the TAF sensor 1000E is configured to input TAF Z height surface tracking characteristic limits (e.g., a surface tracking error limit) defined by an operator, and to perform processing to compare the TAF Z height surface tracking characteristic derived from the TAF sensor 1000E to the limits on a real time basis. For example, when the operator defines the surface tracking error limit as +/−V limit relative to a baseline V, the limit processing portion 1000H performs processing to compare the obtained surface tracking error signal in V to the previously set TAF disable limit to determine whether V is exceeding the limit, i.e., whether it is beyond the +/−V limit relative to the baseline V.

The Z calibration portion 1000I of the TAF sensor 1000E is configured to operate on a surface tracking error signal (e.g., in voltage V) or a TAF deviation signal (in Z height deviation, such as in +ΔZ or −ΔZ) generated by the signal/deviation signal portion 1000F. Generally, the Z calibration portion 1000I performs processing necessary to calibrate the Z height dimension for a given magnification of the objective lens 250. For example, for a low magnification objective lens 250, a full scale TAF deviation signal corresponds to a large Z range, while for a high magnification lens 250, a full scale TAF deviation signal corresponds to a small Z range. This is because the focus is not so sensitive to Z at low magnification, and thus the TAF deviation signal is likewise not so sensitive to Z. Conversely, the focus is sensitive to Z at high magnification, and thus the TAF deviation signal is likewise sensitive to Z. Therefore, a different scale factor and hence a different Z calibration are preferably used for each lens for the purpose of most accurate operation. The Z calibration information generated by the Z calibration portion 1000I is used by the limit processing portion 1000H and the servo control portion 1000A so as to adjust (i.e., Z-calibrate) the TAF disable limit and to focus the imaging portion 205 at the adjusted (i.e., Z-calibrated) Z height corresponding to the current surface height. Although illustrated conceptually as part of the TAF Sensor 1000E, it will be understood that in some embodiments the Z calibration portion 1000I and the limit processing portion 1000H may be implemented in hardware and/or software as a portion of the servo control portion 1000A.

The TAF portion 1000 also includes the TAF enable/disable portion 1000J, which is responsible for providing TAF enable (TAF on) and disable (including TAF off and TAF holding) operations, according to various exemplary embodiments of the present invention. The TAF enable/disable portion 1000J includes a manual start/stop portion 1000K, and an automatic interrupt Type 1 (operation triggered) portion 1000L that includes a Z motion and/or incompatible operation detection portion 1000M and a Type 1 interrupt operations portion 1000N. The TAF enable/disable portion 1000J also includes an automatic interrupt Type 2 (TAF (surface) profile triggered) portion 1000O, which in turn includes a TAF profile trigger definition(s)/limit definition(s) portion 1000P, a TAF profile trigger/limit detection portion 1000Q, and a Type 2 interrupt operations portion 1000R. The Type 2 interrupt operations portion 1000R includes a TAF suspension mode operations portion 1000S, which in turn includes a TAF suspension/Z hold operations portion 1000T and a TAF automatic resumption operations portion 1000V. The TAF suspension/Z hold operations portion 1000T includes a baseline Z height operations portion 1000U. Finally, the TAF enable/disable portion 1000J also includes a program instruction generation operations portion 1000W and a program instruction representation operations portion 1000X.

Figure 3A:
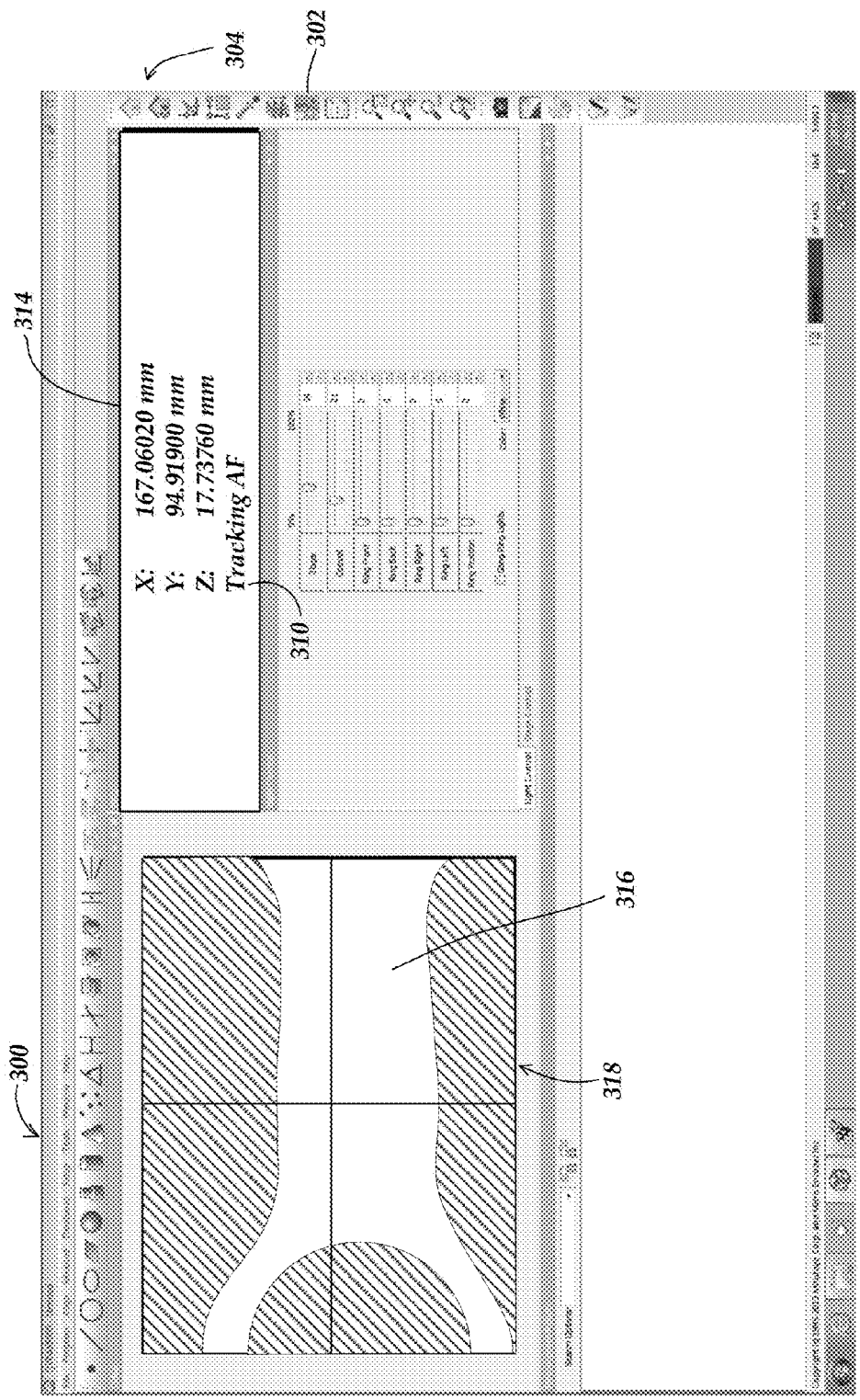
FIGS. 3A-3C are diagrams of a GUI including an image of a workpiece and various windows, user-selectable elements, and messages related to TAF enable and disable operations according to various embodiments of the present invention.

The manual start/stop portion 1000K is operable to permit an operator to manually enable (turn on) or disable (turn off) the TAF sensor 1000E and the servo control portion 1000A to start or stop active TAF Z height adjustments. In this connection, the manual start/stop portion 1000K may cooperate with the TAF GUI elements 135 to display a TAF manual start/stop selection element 302 included in a selection bar 304 of an example GUI 300, as shown in FIG. 3A. In the illustrated example, the manual start/stop selection element 302 is a toggle switch that turns on and off the active Z height controlling function of the TAF portion 1000 each time an operator selects the manual start/stop selection element 302.

The automatic interrupt Type 1 (operation triggered) portion 1000L is responsible for providing a first set of TAF automatic interrupt operations ("Type 1" operations) that are automatically triggered by user-initiated operations that include changing the Z height. In various embodiments, Type 1 operations terminate TAF adjustments of the Z height (i.e., entering into TAF disabled or off mode), wherein there are no conditions under which the TAF portion 1000 automatically resumes Z height adjustments without a user-initiated instruction to restart Z height adjustments. For example, unless an operator manually selects the manual start/stop selection element 302 described above in reference to FIG. 3A to resume TAF adjustments of the Z height, the TAF portion 1000 remains in TAF disabled or off mode. The automatic interrupt Type 1 operations are defined in the Type 1 interrupt operations portion 1000N.

The first set (Type 1) of TAF automatic interrupt operations are useful because user-initiated operations that include changing the Z height may likely exceed the TAF portion's capability to automatically adjust to the new, user-defined Z height to continue maintaining focus at that new Z height. Examples of user-initiated operations that include changing the Z height include an explicit Z height adjustment operation, wherein an operator explicitly sets or adjusts the current Z height (1016 at FIG. 1D) via the input devices 138, such as by entering a numeric Z height value using the keyboard 24 or by physically moving the relative positions of the imaging portion 205 and the workpiece stage 210 using the joystick 22. Further examples of user-initiated operations that include changing the Z height include operations associated with an image-based autofocus video tool (e.g., 143a in FIG. 1B) that may be included in the machine vision inspection system 100. As described in the background section above, machine vision inspection systems may include both image-based autofocus video tools and signal-based autofocus devices for controlling continuous autofocus. The TAF portion 1000 is an example of the signal-based autofocus devices. The image-based autofocus video tools are configured to maintain autofocus based on analysis of acquired images, such as analysis of the contrast in acquired images. The operations associated with an image-based autofocus video tool are likely to cause adjustments of the Z height as a result of the image analysis, which may be incompatible with the adjustments of the Z height performed by the TAF portion 1000. Thus, in accordance with various embodiments of the present invention, operations associated with an image-based autofocus video tool are treated as the user-initiated operations that include changing the Z height, which automatically trigger the first set ("Type 1") of TAF automatic interrupt operations. The Z motion and/or incompatible operation detection portion 1000M is responsible for detecting any user-initiated operations that include changing the Z height and that trigger the first set ("Type 1") of TAF automatic interrupt operations.

The automatic interrupt Type 2 (TAF profile triggered) portion 1000O is responsible for providing a second set of TAF automatic interrupt operations ("Type 2" operations) that are automatically triggered based on at least one respective TAF Z height surface tracking characteristic (e.g., a surface tracking error) exceeding a previously set TAF disable limit. In various embodiments, the Type 2 operations include the TAF suspended or holding mode, wherein the TAF holding mode includes discontinuing TAF adjustments of the Z height and further includes that if the at least one respective TAF Z height surface tracking characteristic returns below the previously set TAF disable limit during the TAF holding mode, then TAF Z height adjustments are automatically resumed without a user-initiated instruction.

Figure 2:
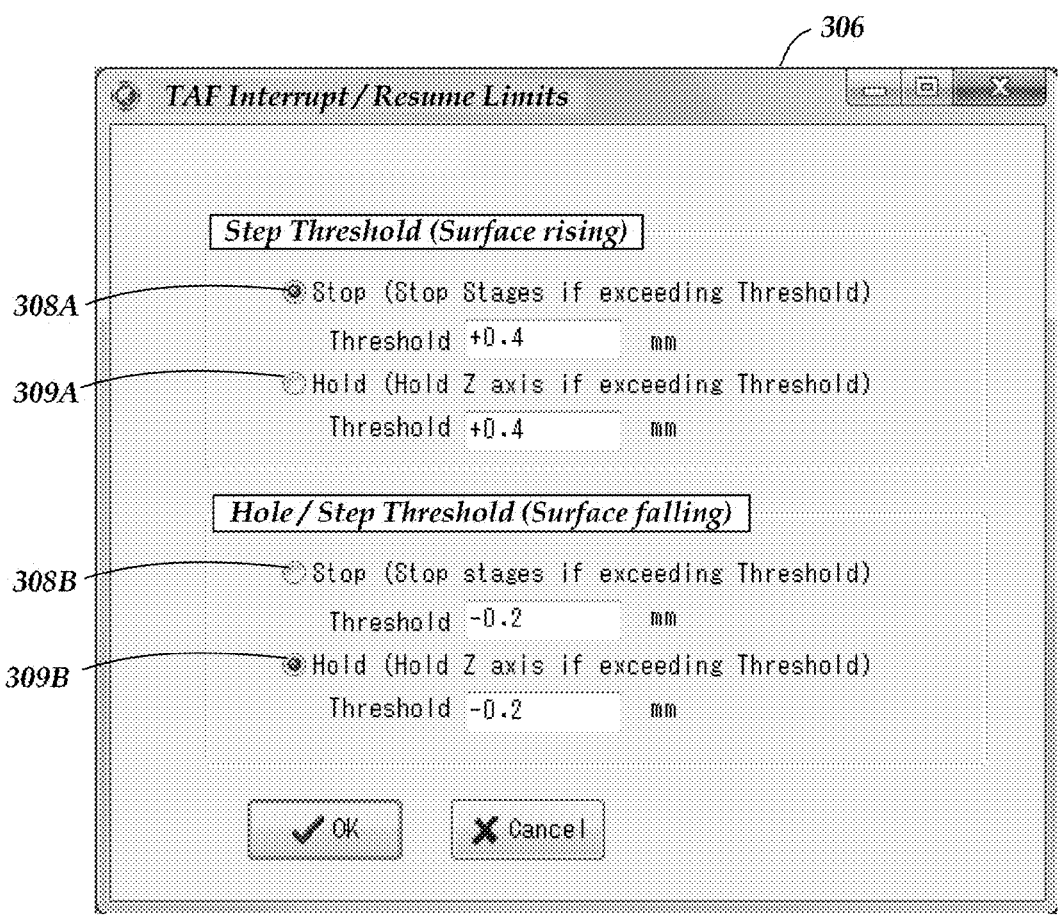
FIG. 2 is an example GUI window that may be used to permit an operator to set TAF disable limits, which are used to trigger TAF disable operations according to various embodiments of the present invention.

For example, the at least one respective TAF Z height surface tracking characteristic may be the TAF deviation signal (e.g., +ΔZ, −ΔZ height) generated by the signal/ deviation signal portion 1000F, and the previously set TAF disable limit may be a limit on the TAF deviation signal. In this connection, as shown in FIG. 2, TAF disable limit definition elements 309A and 309B may be provided in a GUI window 306 of the machine vision inspection system 100 to permit an operator to define the previously set TAF disable limits. In the illustrated example of the GUI window 306, an operator has set the TAF disable limits as +0.4 mm and −0.2 mm for a rising surface and a falling surface, respectively. Then, according to exemplary embodiments of the present invention, when the TAF deviation signal derived from the signal/deviation signal portion 1000F exceeds the +0.4 mm limit in the positive direction or exceeds the −0.2 mm limit in the negative direction, this triggers the second set ("Type 2") of TAF automatic interrupt operations. In various embodiments, the second set of TAF automatic interrupt operations include the TAF holding mode, wherein TAF adjustments of the height are discontinued but, if the TAF Z height surface tracking characteristic returns below the previously set TAF disable limit during the TAF holding mode, then TAF Z height adjustments are automatically resumed without a user-initiated instruction. Continuing the above-described example, after the TAF portion 1000 enters into the TAF holding mode, when the TAF deviation signal returns below the previously set TAF disable limits (i.e., returns within the +0.4 mm and −0.2 mm range in the illustrated embodiment), then TAF Z height adjustments are automatically resumed without a user-initiated instruction.

The second set ("Type 2") of TAF automatic interrupt operations are defined in the Type 2 interrupt operations portion 1000R. The Type 2 interrupt operations portion 1000R includes the TAF suspended mode operations portion 1000S that defines operations of the TAF portion 1000 during the TAF suspended (holding) mode. The TAF suspended mode operations portion 1000S includes the TAF suspension/Z hold operations portion 1000T, which defines the operations to be performed by the TAF portion 1000 upon entering the TAF suspended/holding mode in which TAF Z height adjustments are discontinued. The TAF suspension mode operations portion 1000S also includes the TAF automatic resumption operations portion 1000V, which defines the operations to be performed in exiting the TAF suspended/holding mode to automatically resume TAF Z height adjustments.

The second set of TAF automatic interrupt operations including the TAF holding mode are useful, for example, when the vision inspection system 100 is used to inspect a workpiece including holes or bosses, wherein oftentimes what needs to be inspected is an edge of each hole or a boss, as opposed to the bottom surface of each hole or the top surface of the boss. Then, it is useful to suspend operation of the TAF portion 1000 in the hole, or on the boss, to ease the burden on the TAF portion 1000 to track and maintain focus at the edges. Specifically, when the TAF portion 1000 remains enabled after it traverses a first edge of a hole (i.e., a falling edge), the TAF portion 1000 operates to ensure that the imaging portion 205 is focused at the bottom surface of the hole, and when it next traverses a second edge of the same hole (i.e., a rising edge), the TAF portion 1000 must quickly adjust the focus back to the original surface height in order to obtain a well-focused image of the rising edge. This, however, may be difficult to achieve especially when the hole is deep or when the hardware (e.g., a camera system) that needs to be moved for the adjustment is massive. The second set of TAF automatic interrupt operations including the TAF holding mode are useful in allowing to selectively suspend or hold operation of the TAF portion 1000 so as to ease the burden on the TAF portion 1000, especially at surface discontinuities such as at edges found in a workpiece.

The TAF profile trigger definition(s)/limit definition(s) portion 1000P defines what limits (e.g., Z increase (+ΔZ), Z decrease (−ΔZ)) are used to trigger what operations (suspend, resume, stop, etc.) in the first and second sets of TAF automatic interrupt operations according to various embodiments of the present invention. The TAF Z height surface tracking characteristics, for which an operator may define respective limits, may include, as non-limiting examples, the Z height as controlled by the TAF portion 1000, the rate of change in the Z height as a function of time, the rate of change of the Z height as a function of distance along an X-Y direction, a surface tracking error comprising a difference between the current Z height at a current XY position and an indication of the required TAF focus Z height at the current XY position (e.g., a voltage V signal as derived from the signal/deviation signal portion 1000F described above), and a TAF deviation signal that is indicative of a difference between the current Z height at a current XY position and the required TAF focus Z height at the current X Y position (e.g., the TAF deviation signal in Z as derived from the signal/deviation signal portion 1000F). The TAF disable limits that may be previously set for the corresponding TAF Z height surface tracking characteristics include, as non-limiting examples, an absolute Z height limit, a relative Z height limit defined relative to a current baseline Z height of the TAF portion 1000, a limit on the rate of change in the Z height as a function of time, a limit on the rate of change of the Z height as a function of distance along an X-Y direction, a limit on the surface tracking error, and a limit on the TYAF deviation signal.

The limits may be generally related to abrupt and/or large discontinuities on a workpiece surface, and may be especially related to the edges of certain types of holes, such as those holes having steeply falling and rising edges. In various embodiments, absolute (Z height) limit(s) may be set relative to the Z-height corresponding to when the TAF portion 1000 is turned on, or may be fixed at the Z-height(s) defined by the user during learn mode operations. Absolute (Z height) limit(s) may be fixed either in a workpiece coordinate system (e.g., using one corner of a rectangular workpiece as the (X, Y, Z) origin) or in a machine coordinate system defined by the linear scales of the workpiece stage having the (X, Y, Z) origin. In various embodiments, relative (Z height) limit(s) are default limits, such as those corresponding to a reliable sensing range (or normal control range) of the TAF portion 1000. Alternatively, relative (Z height) limit(s) may be defined and/or redefined by an operator during learn mode operations. For example, the operator may define/redefine relative limit(s) to ensure that TAF Z height adjustments are suspended at a Z height of holes found in a workpiece for which a part program is created.

When a relative Z height limit is defined relative to a current baseline Z height, the current baseline Z height may be a fixed Z height defined for a current instance of TAF Z height adjustment operations. For example, the current baseline Z height may be fixed at the Z height corresponding to when the current instance of the TAF portion 1000 is turned on, or may be fixed at a Z height defined by an operator during learn mode of operations. As a further example, the current baseline Z height may be an adaptively changing baseline Z that is determined based on a set of recent Z heights as controlled by the TAF portion 1000. For example, the adaptively changing baseline Z may be the average of a set of the most recent controlled Z heights over the last X milliseconds, or over the last X millimeters of XY distance, which may be in proportion to the extent of the field of view depending on magnification. As further examples, when TAF Z height adjustments are automatically resumed, the adaptively changing baseline Z may be set to a new value based on a current actual Z height as adjusted (corrected) by the TAF deviation signal derived from the signal/deviation signal portion 1000F, or as adjusted (corrected) by way of the actual TAF adjustments of the Z height implemented by the TAF portion 1000 after resuming. In various embodiments, the current baseline Z height is automatically set to correspond to the null (zero) TAF deviation signal that is indicative of the best focus position. The current baseline Z height may be fixed either in a workpiece coordinate system or in a machine coordinate system. The baseline Z height operations portion 1000U of the TAF suspension/Z hold operations portion 1000T is responsible for setting the baseline Z height to be compared to relative (Z height) limit(s) that may be set by an operator.

The TAF profile trigger definition(s)/limit definition(s) portion 1000P may define what limits (e.g., Z increase (+ΔZ), Z decrease (−ΔZ)) are used to trigger what operations (suspend, resume, stop, etc.) in the first ("Type 1") and second ("Type 2") sets of TAF automatic interrupt operations according to various embodiments of the present invention. Referring additionally to FIG. 2, for example, the GUI window 306 allows an operator to set Z increase and Z decrease limits 308A and 308B, respectively, that automatically trigger the first ("Type 1") set of TAF automatic interrupt operations to stop (disable, or turn off) TAF Z height adjustments of the TAF portion 1000. As described above, the GUI window 306 also allows an operator to set Z increase and Z decrease limits 309A and 309B, respectively, that automatically trigger the second ("Type 2") set of TAF automatic interrupt operations to suspend (or hold) TAF Z height adjustments. As described above, in various embodiments, those same TAF disable limits 309A and 309B used to automatically trigger the second set of TAF automatic interrupt operations may also be used to automatically resume TAF Z height adjustments when the tracked characteristic returns below the limits. For example, once respective TAF Z height surface tracking characteristics that have exceeded the limits to automatically trigger the TAF suspension/holding mode return below the limits, TAF Z height adjustments may be automatically resumed without a user-initiated instruction.

Alternatively, in other embodiments, an operator may wish to set the TAF resume limits for the second ("Type 2") set of TAF automatic interrupt operations differently from the TAF disable limits. For example, it is possible to set the TAF disable limit as +0.4 mm and the TAF resume limit as +0.2 mm. In this example, TAF Z height adjustments are automatically suspended when the TAF deviation signal exceeds the TAF disable limit of +0.4 mm, while TAF Z height adjustments are automatically resumed only after the TAF deviation signal returns to below the TAF resume limit of +0.2 mm.

As shown in FIG. 2, an operator may be allowed to set different limits (308A and 308B; and 309A and 309B), respectively, to trigger the first set of TAF automatic interrupt operations (TAF "stop") and the second set of TAF automatic interrupt operations (TAF "hold"). Further, the operator may be allowed to select which one of the first set and the second set of TAF automatic interrupt operations is to be triggered. In the example of FIG. 2, the operator has defined the Z increase limit of +0.4 mm in each of the TAF disable limit definition element 308A to trigger the stop (disabled) mode and the TAF disable limit definition element 309A to trigger the holding (suspended) mode, but the operator has selected to activate the TAF disable limit definition element 308A for the stop mode. On the other hand, the operator has defined the Z decrease limit of −0.2 mm in each of the TAF disable limit definition element 308B to trigger the stop (disabled) mode and the TAF disable limit definition element 309B to trigger the holding (suspended) mode, but the operator has selected to activate the TAF disable limit definition element 309B for the holding mode. Thus, in operation, when the Z increase limit of +0.4 mm is exceeded, the TAF portion 1000 automatically enters into the stop (disabled or off) mode as opposed to the holding mode. On the other hand, when the Z decrease limit of −0.2 mm is exceeded, the TAF portion 1000 automatically enters into the holding (suspended) mode as opposed to the stop mode. The TAF profile trigger/limit detection portion 1000Q of the TAF enable/disable portion 1000J is responsible for triggering defined TAF automatic interrupt operations (of Type 1 or Type 2) upon detecting that a previously set TAF disable limit for the corresponding type (set) of TAF automatic interrupt operations is exceeded.

The TAF disabled or off mode and the TAF stop mode, described above, are the same in that the TAF portion 1000 is completely disabled or turned off and the TAF sensor 1000E does not generate a focus signal in both. However, the TAF stop mode is entered into automatically when corresponding TAF disable limits (308A, 309A) are exceeded, which is different from the TAF disabled or off mode that is entered into by default or based on user selection of the TAF manual start/stop selection element 302 (see FIG. 3A). Therefore, in some embodiments, the status signal portion 1000G of the TAF sensor 1000E may generate signals that cause the GUI to display the TAF "stop" or error mode, differently from the TAF disabled or off mode, such that an operator may appreciate what has triggered disabling of the TAF portion 1000 in a particular instance.

As will be apparent to those skilled in the art, various operations regarding the TAF portion 1000 described above may be implemented by hardware configuration, software configuration, or a combination of hardware and software configuration and, therefore, various hardware and/or software components of the TAF portion 1000 may be suitably arranged between the vision components portion 200 and the control system portion 120 of the machine vision inspection system 100 depending on each implementation. In some embodiments, TAF disable limits may be defined on the software side and passed to the hardware side of the servo control portion 1000A and the TAF sensor 1000E as limits and subsequent operations are performed on the hardware side. In other embodiments, the TAF enable and disable operations described above are mostly carried out on the software side, in the control system portion 120, based on feedback signals received from various components on the hardware side of the machine vision inspection system 100. For example, TAF deviation signals generated by the signal/deviation signal portion 1000F may depend not only on the surface profile of a workpiece being imaged but also on the XY speed of the workpiece stage 210 when crossing the surface profile. Thus, the signal/deviation signal portion 1000F on the software side may generate TAF deviation signals, which take into consideration various factors such as the XY speed of the workpiece stage 210. Accordingly, the structure and hierarchy of the TAF portion 1000 depicted in FIG. 1C is an example possible architecture, and different architectures are equally possible depending on each implementation.

Still referring to FIG. 1C, the TAF GUI elements 135, in cooperation with the TAF portion 1000, provide GUI related to the TAF enable and disable operations described above.

Figure 3B:
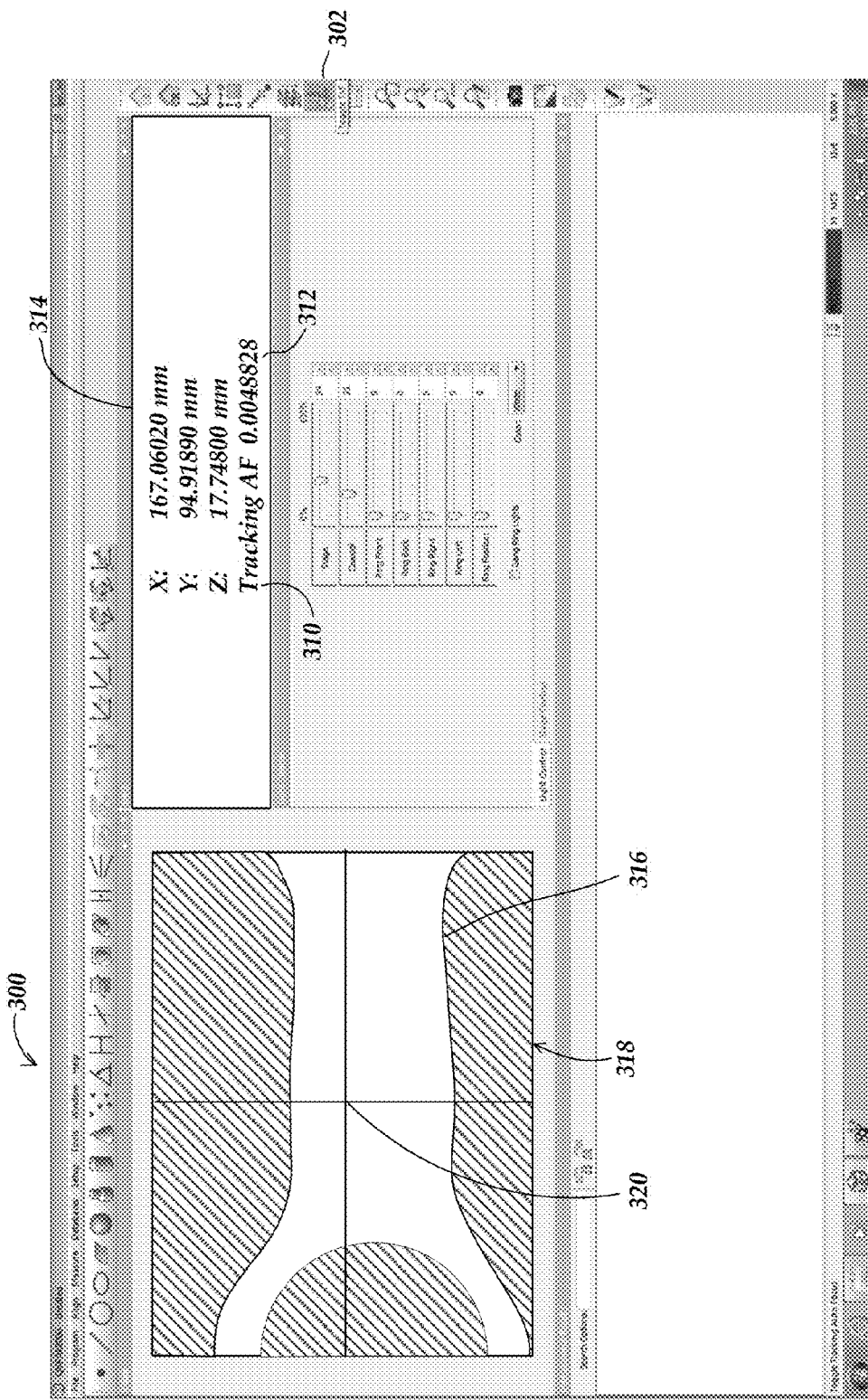
Figure 3C:
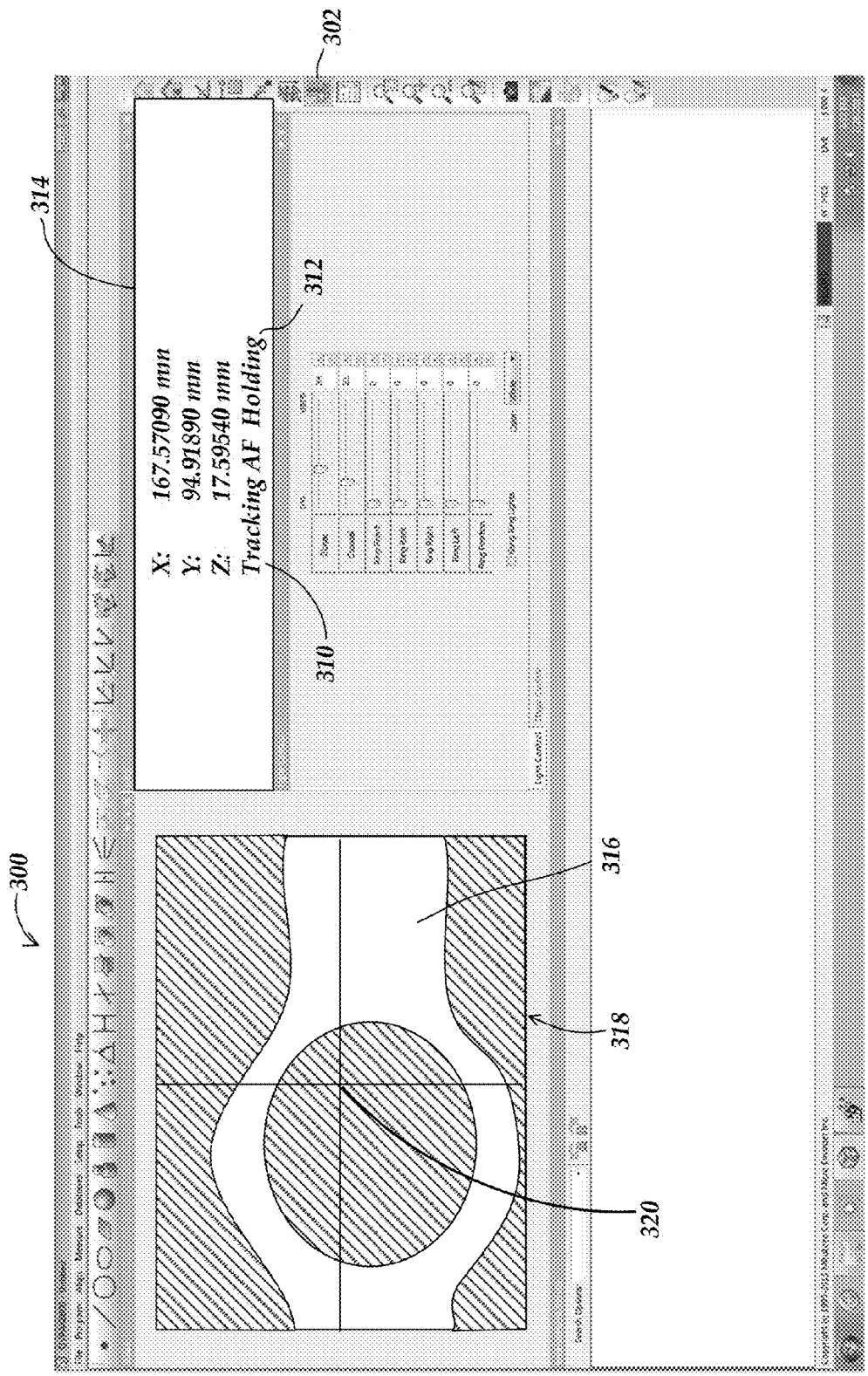

The TAF GUI elements 135 include a TAF status indication portion 135A, which displays on the GUI the TAF deviation signal, as in +ΔZ and −ΔZ, outputted from the signal/deviation signal portion 1000F as well as the TAF operation status/mode signal outputted from the status signal portion 1000G. FIG. 3B shows an example GUI 300 in the TAF enabled/on mode. The GUI 300 of FIG. 3B shows "Tracking AF" in the color green as a TAF status/mode message 310, meaning that TAF is on, next to the TAF deviation signal value of "0.0048828" in a TAF deviation signal display 312 indicating a positive Z height deviation of 0.0048828 mm relative to the required TAF focus Z height. FIG. 3A shows an example GUI 300 in the TAF disabled/off mode. The GUI 300 of FIG. 3A shows "Tracking AF" in the color red, meaning that TAF is off. Because TAF is off, nothing appears in the TAF deviation signal display 312 in the TAF disabled/off mode. FIG. 3C shows an example GUI 300 in the TAF suspended/holding mode. The GUI 300 of FIG. 3B shows "Tracking AF" in the color green, meaning that a focus signal (e.g., a TAF deviation signal) is generated by the TAF sensor 1000E, but is not used to implement TAF Z height adjustments as indicated by the word "Holding" appearing in the TAF deviation signal display 312. The TAF status/mode message 310 and the TAF deviation signal display 312 are shown in real time to assist an operator in verifying the current status (or operation mode) of the TAF enable and disable operations, including verifying the relevant TAF Z height surface tracking characteristic value such as the TAF deviation signal value.

The TAF GUI elements 135 also include a TAF setup UI portion 135B, which includes an interrupt/disable limits UI portion 135C and a resume limits UI portion 135D. The interrupt/disable limits UI portion 135C is responsible for generating and displaying various GUI windows to assist an operator in defining TAF disable limits, which may be used to trigger the second set ("Type 2") of TAF automatic interrupt operations or the first set ("Type 1") of TAF automatic interrupt operations, as described above in reference to FIG. 2. The resume limits UI portion 135D may be operable to generate and display various GUI windows to assist an operator in defining TAF resume limits, which may be used to trigger automatic restart of TAF Z height adjustments after they are suspended.

The TAF GUI elements 135 also include a TAF program instruction representations portion 135E, operable to generate and display various GUI windows in connection with creation and editing of a part program. In particular, the program instruction generation operations portion 1000W and the program instruction representation operations portion 1000X of the TAF enable/disable portion 1000J cooperate with the TAF program instruction representations portion 135E to generate a part program, and to display part program instruction representations in a part program editing window in the GUI, respectively. Operation of the TAF program instruction representations portion 135E will be described later in reference to FIGS. 4A-4F.

FIGS. 3A-3C are diagrams of GUI 300 including an image of a workpiece and various windows, user-selectable elements, and messages related to TAF enable and disable operations according to various embodiments of the present invention.

FIG. 3A shows the TAF manual start/stop selection element 302, which may be used by an operator to manually turn on or off TAF Z height adjustments of the TAF portion 1000. In FIG. 3A, TAF is initially "off" or disabled, which is indicated by the "Tracking AF" in the color red shown as the TAF status/mode message 310. In the illustrated embodiment, the TAF status/mode message 310 appears in a lower portion of a real-time X-Y-Z (position) coordinate window 314 that indicates the X-Y-Z position of a workpiece being imaged/analyzed on the workpiece stage 20 in a relevant coordinate system. That TAF is "off" or disabled is also indicated by that no value is displayed in the TAF deviation signal display 312. Because "Tracking AF" is off (TAF off/disabled), a (video) image of a workpiece 316 displayed in a field of view window 318 is out of focus.

FIG. 3B shows that TAF is now turned "on" or enabled, based on user selection of the TAF manual start/stop selection element 302. As shown in FIG. 3B, the user's cursor becomes a "Toggle TAF" message when hovering over the TAF manual start/stop selection element 302. That TAF is "on" and TAF Z height adjustments are performed is indicated by the "Tracking AF" message appearing in the color green as the TAF status/mode message 310, together with a TAF deviation signal value of "0.0048828 mm" shown in the TAF deviation signal display 312. As a result, the (video) image of the workpiece 316 displayed in the field of view window 318 is starting to be in focus, though the autofocusing has not yet been completed in FIG. 3B. Note that TAF Z height adjustments are performed at an X-Y position indicated by the TAF sensing spot 320 (i.e., the TAF laser beam spot LP in FIG. 1D).

FIG. 3C shows that TAF is now "holding" or suspended, based on a defined TAF Z height surface tracking characteristic (e.g., a TAF deviation signal) exceeding a previously-set TAF disable limit. In the illustrated example, the TAF holding mode was automatically triggered when the workpiece 316 was traversed such that the TAF sensing spot 320 came to be over a hole of the workpiece 316, as shown in the field of view window 318. That TAF is in the holding mode is indicated by the "Holding" message appearing in the TAF deviation signal display 312. At this time, the "Tracking AF" status/mode message 310 appears in the color green, indicating that TAF is not off or disabled (which would be indicated by the "Tracking AF" message in the color red) but is merely suspended or holding. The field of view window 318 shows a well-focused image of the workpiece 316 at this time, because TAF Z height adjustments initiated in FIG. 3B have been completed. In accordance with various embodiments of the present invention, entering into the TAF holding mode as shown in FIG. 3C is automatically triggered by a defined TAF Z height surface tracking characteristic exceeding a previously-set TAF disable limit. In various embodiments, upon entering the TAF holding mode, the TAF portion 1000 holds the focus Z height position that was held immediately prior to entering the TAF holding mode such that when TAF Z height adjustments are resumed, the held focus Z height position will be available as a starting Z position for the TAF portion 1000.

FIGS. 4A-4F are diagrams of GUI 300 including an image of a workpiece and various windows, user-selectable elements, and messages related to TAF enable and disable operations, and in particular including a part program editing window 322 including part program instruction representations corresponding to TAF enable and disable operations according to various embodiments of the present invention. The TAF program instruction representations portion 135E of the TAF GUI elements 135 is operable to generate and display the part program editing window 322, in cooperation with the program instruction representation operations portion 1000X of the TAF portion 1000. FIGS. 4A, 4B and 4D-4F illustrate GUI 300 in learn mode of operation of the machine vision inspection system 100, in which an operator is creating and/or editing a part program including TAF enable and disable operations.

Figure 4A:
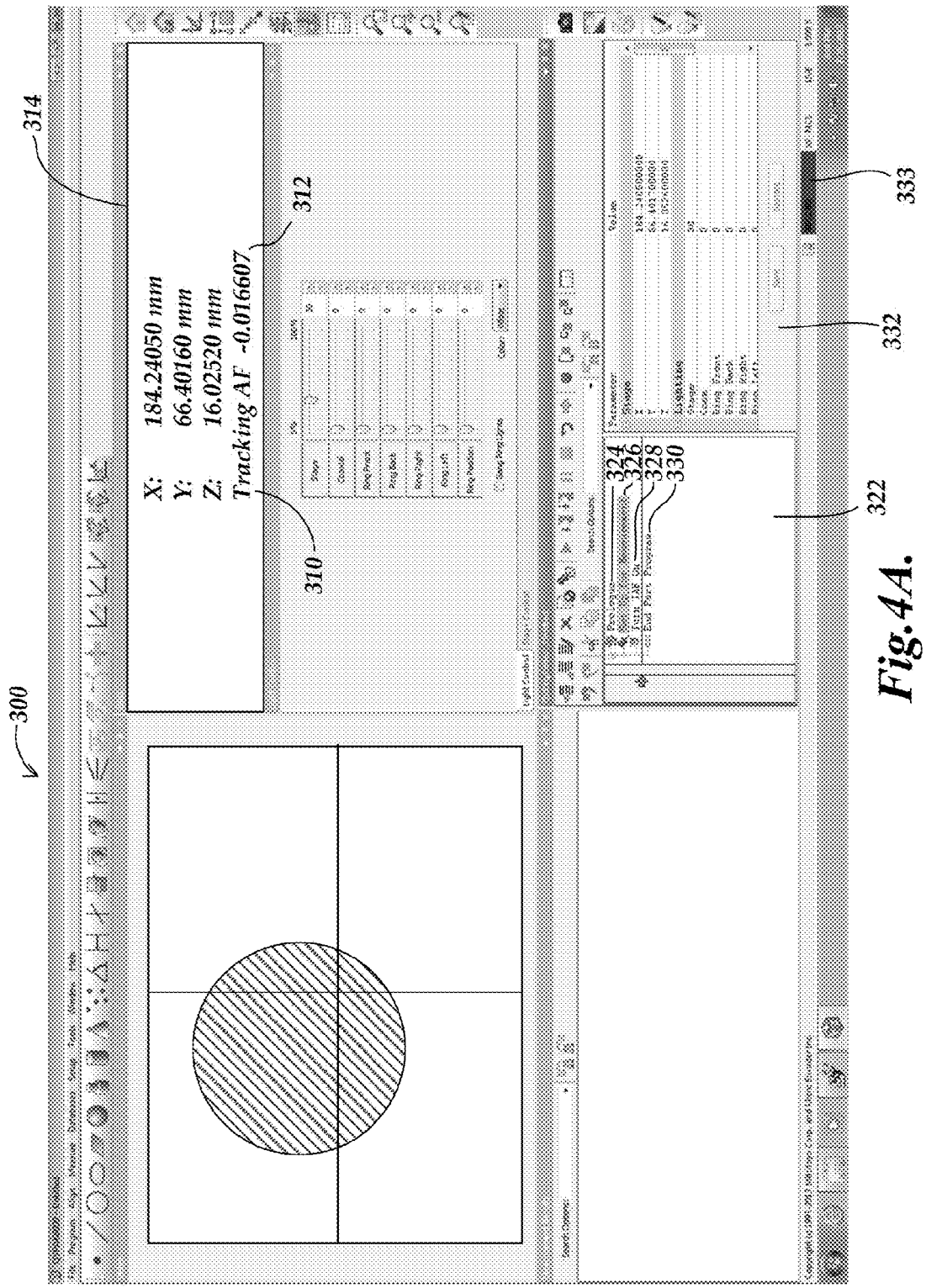
FIGS. 4A-4F are diagrams of a GUI including an image of a workpiece and various windows, user-selectable elements, and messages related to TAF enable and disable operation, and in particular including a part program editing window including part program instruction representations corresponding to TAF enable and disable operations according to various embodiments of the present invention.

FIG. 4A shows the GUI 300 that may be displayed when TAF is turned on (enabled) during learn mode of operating the machine vision inspection system 100, in which an operator creates a part program. A learn/run mode status box 333 indicates "RECORD," meaning that the machine vision inspection system 100 is in learn mode to record a part program. That TAF is turned "on" and TAF Z height adjustments are actively performed is indicated by the "Tracking AF" message 310 appearing in the color green, together with a TAF deviation signal value of "−0.016607 mm" appearing in the TAF deviation signal display 312. As a result, the TAF portion 1000 attempts to adjust the Z height at an X-Y position where TAF is enabled. At this time, the part program editing window 322 includes part program instruction representations 324, 326, 328, 330 corresponding to operations to be performed by the machine vision inspection system 100 when the part program is executed. The GUI 300 also includes a parameter and value window 332, which reflects the real-time X-Y-Z (position) coordinate of a workpiece being imaged on the workpiece stage 210 in a relevant coordinate system, which is the same as that shown in the coordinate window 314.

In the part program editing window 322, a "Prologue" node 324 represents a process needed to run a part program in the run mode, which is typically generated when the learn mode is entered. The "Prologue" node 324 is a parent node, which includes three childe nodes: a "Set Up for Measurement" node 326, a "Turn TAF On" node 328, and an "End Part Program" node 330. The "Set Up for Measurement" node 326 defines and represents setting needed to run a video tool such as light setting and workpiece stage setting including stage Z height setting. The "Turn TAF On" node 328 turns on, or enables, the TAF portion 1000 so as to start TAF Z height adjustments. The "End Part Program" node 330 concludes operation of the part program.

In the illustrated embodiment, the "Set Up for Measurement" node 326 is automatically inserted before the "Turn TAF On" node 328, according to various embodiments of the present invention. This is because, during run mode when the part program is executed, it is desirable to set the Z height of the machine vision inspection system 100 where the TAF portion 1000 is likely to find a track-able workpiece surface within its focus range or focus limits. Therefore, it is desirable to insert the "Set Up for Measurement" node 326 that defines the workpiece stage Z height setting, before the "Turn TAF On" node 328 that turns on the TAF portion 1000. Thus, according to various embodiments, during the learn mode of operation and when TAF is disabled, if the Z height is successfully adjusted by the TAF portion 1000 at a Z height Zadj, then in the part program editing window 322, instruction representations are displayed that firstly position the machine vision inspection system 100 at the adjusted Z height position (X, Y, Zadj) (in the "Set Up for Measurement" node 326 in FIG. 4A) and that secondly enables TAF operations at that position (in the "Turn TAF On" node 328 in FIG. 4A). On the other hand, according to various embodiments, during the learn mode of operation and when TAF is disabled, if the Z height is not successfully adjusted by the TAF portion 1000, then the TAF enable attempt is cancelled and a set of TAF enable instruction representations (e.g., the "Turn TAF On" node 328) are not displayed in the part program editing window 322. This may be desirable because, if the Z height where the TAF portion 1000 is likely to find a track-able surface within its focus range or focus limits is not achieved, then it is likely that the TAF portion 1000, even if turned on, will not function properly.

Figure 4B:
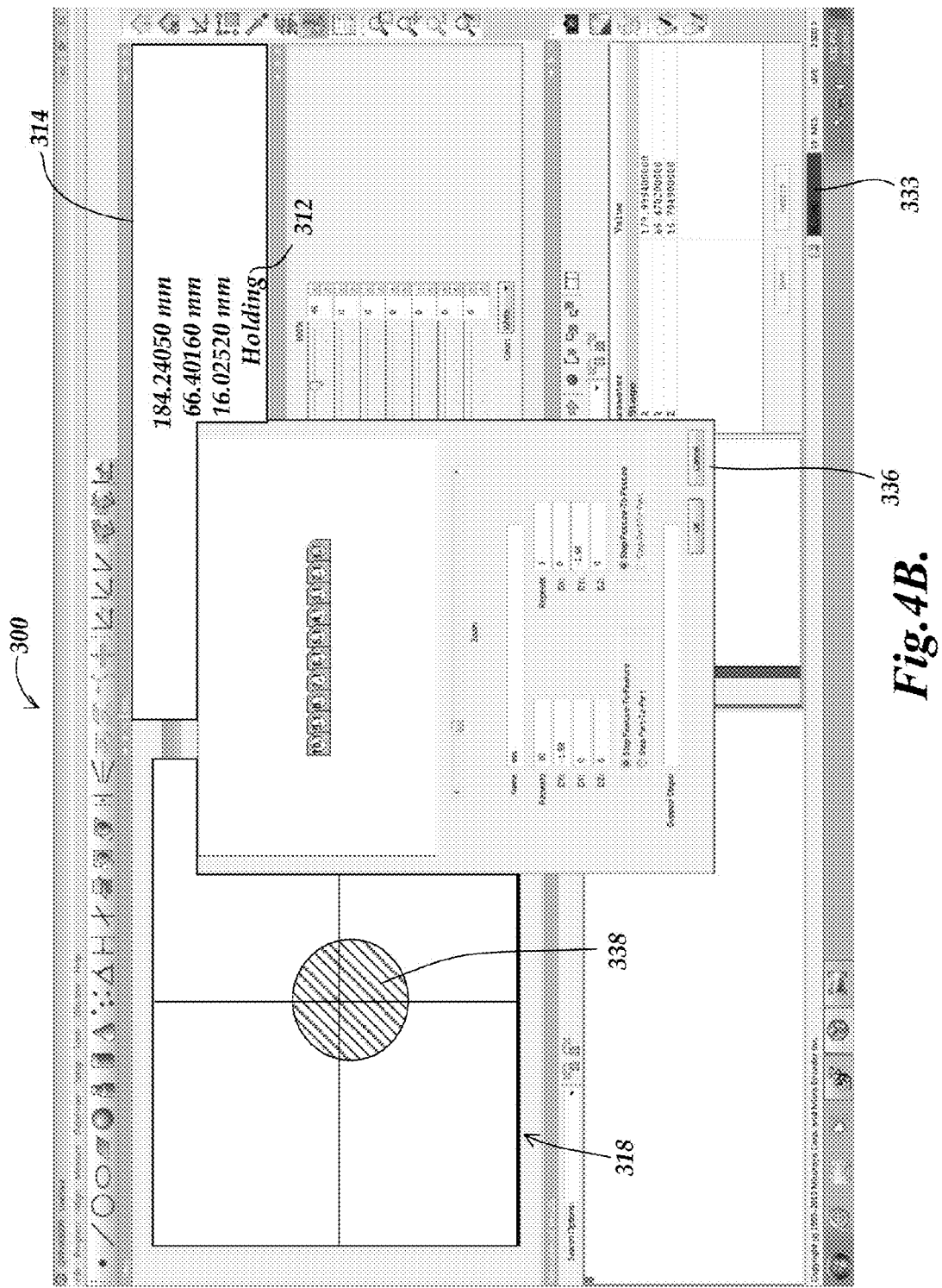

FIG. 4B shows the GUI 300 when the operator has selected to define a step and repeat loop in an "Array Step and Repeat" window 336, to be incorporated into the part program. Briefly, a step and repeat loop defines a repeated operation block of inspection instructions to be executed N (multiple) times at N defined locations in an array of workpiece features. The "Array Step and Repeat" window 336 in the illustrated embodiment defines an operation block to be executed 10 times at 10 defined locations along the X (horizontal) axis, starting with operation block 1.1 and ending with operation block 10.1. As a result, as shown in the field of view window 318, the workpiece is traversed to a hole 338, which is located at the array starting location of the first operation block 1.1. When the depth of the hole 338 exceeds a TAF disable limit previously set for the TAF portion 1000, the TAF portion 1000 automatically enters into the TAF holding mode, as shown in the "Holding" message appearing in the TAF deviation signal display 312.

Figure 4C:
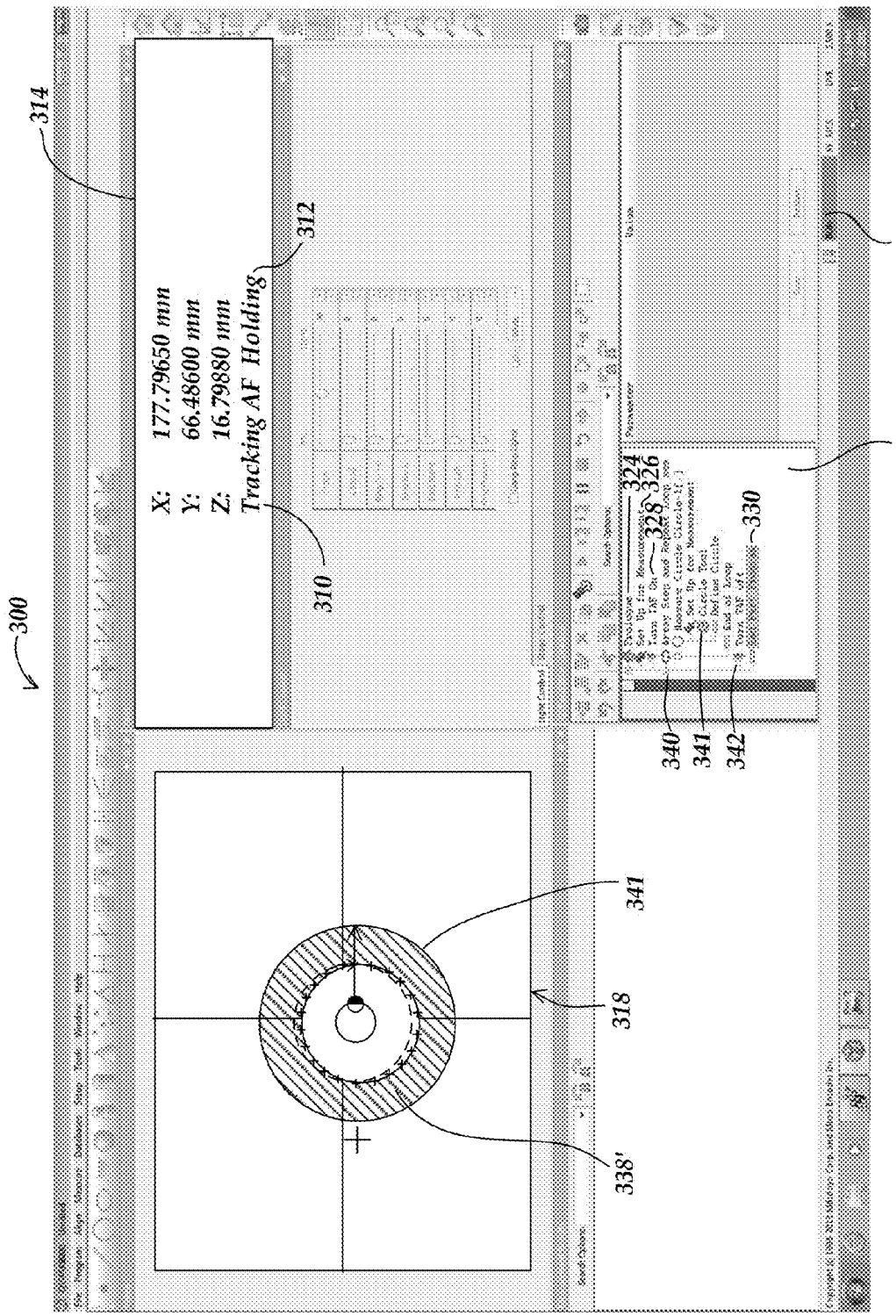

FIG. 4C shows the GUI 300 when the part program has been created and is currently running in "run" mode 334 (as opposed to "learn" mode 333 in FIGS. 4A, 4B and 4D-4F) to confirm proper execution of the part program. At this time, the part program editing window 322 includes part program instruction representations for the completed part program, including the same "Prologue" node 324, "Set Up for Measurement" node 326, "Turn TAF On" node 328, and "End Part Program" node 330 as in FIG. 4A, plus a newly-defined "Array Step and Repeat Loop" node 340 (defined in FIG. 4B) and a "Turn TAF Off" node 342. The "Array Step and Repeat Loop" node 340 includes a circle tool 341, which is a video tool operable to determine or inspect a circle shape. The field of view window 338 is showing a (video) image of the last hole 338' at the last operation block 10.1 of the step and repeat loop, to which the circle video tool 341 is applied to define and inspect the circle shape of the hole 338'. Referring back to the part program editing window 322, the "Turn TAF Off" node 342 is automatically inserted before the "End Part Program" node 330 because it is desirable to turn TAF off (to thereby turn off the TAF laser spot 320) at the end of each part program for eye safety reasons. In FIG. 4C, because the TAF portion 1000 has tracked a bottom surface of the last hole 338' that exceeded the a previously-set TAF disable limit, the "Holding" message is appearing in the TAF deviation signal display 312 next to the "Tracking AF" message in the color green appearing as the TAF status/mode message 310. Note that the Z coordinate in the coordinate window 314 of FIG. 4C is changed from the Z coordinate in the coordinate window 314 of FIG. 4B. This indicates that the TAF portion 1000 has been actively performing TAF Z height adjustments between the holes, while suspending TAF Z height adjustment at each of the holes. That is, the TAF portion 1000 has been repeatedly alternating between the TAF holding mode and the TAF enabled/on mode in traversing each of the holes and an area between the holes, respectively.

Figure 4D:
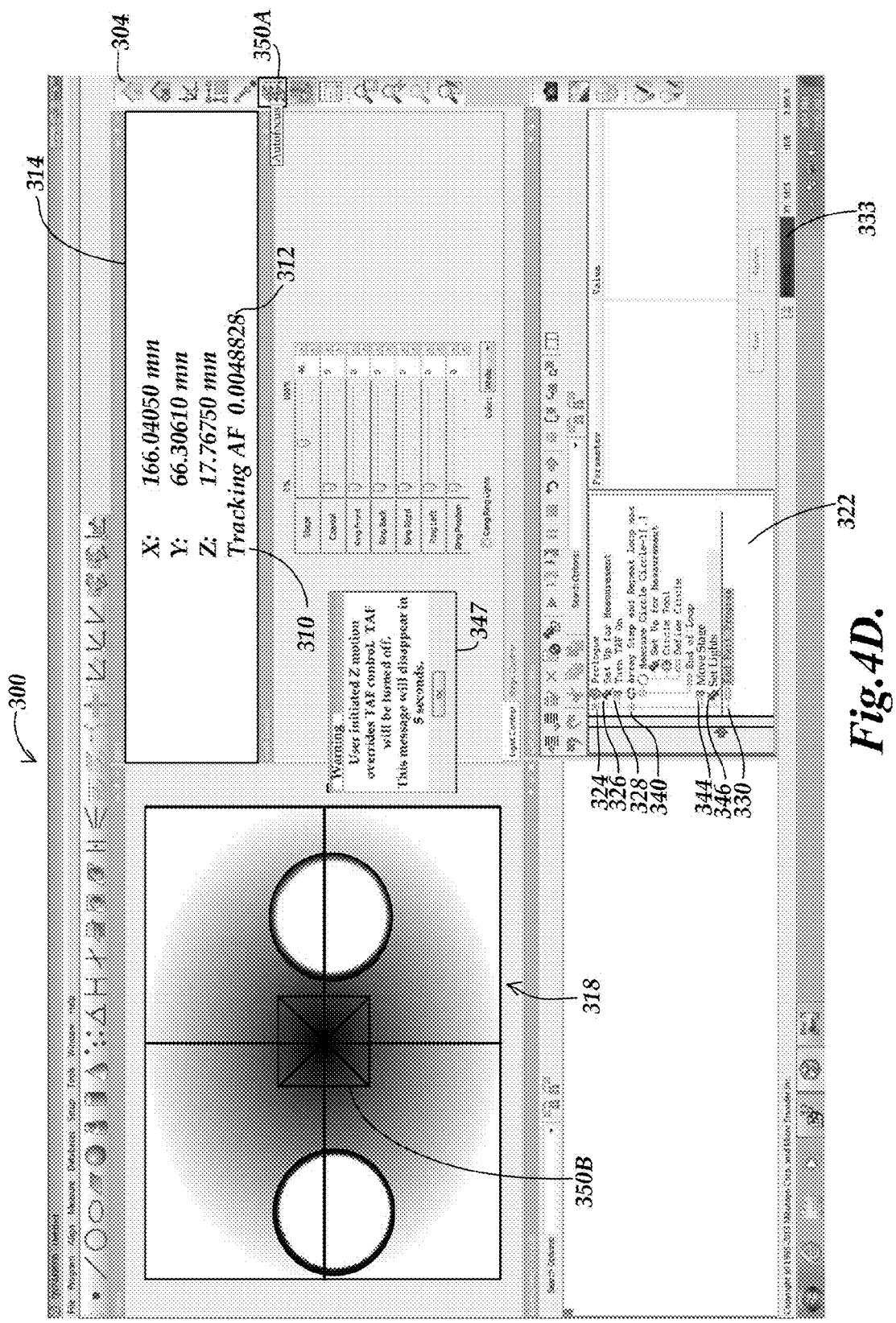

FIG. 4D shows the GUI 300, in learn mode of operation, wherein the operator has resumed editing the part program in the part program editing window 322, after it has been run in FIG. 4C. Upon resuming editing, the operator has deleted the "Turn TAF Off" node 342, which was inserted at the end of the part program that has been run for eye safety reasons in FIG. 4C. As a result, the TAF portion 1000 returns to the previous TAF on/enabled mode as indicated by the "Tracking AF" message 310 appearing in the color green and the real time TAF deviation signal value appearing in the TAF deviation signal display 312. Then, the operator has moved the X-Y position (but not Z) of the workpiece stage 210 from the position at FIG. 4C, and adjusted the light setting at the new location, as shown by the insertion of a "Move Stage" node 344 and a "Set Light" node 346 after the "Array Step and Repeat Loop" node 340 in the part program editing window 322.

Then, the operator has wished to add an image-based autofocus video tool to achieve autofocus based on analysis of an acquired image of the workpiece. The image-based autofocus video tool may be selected, for example, by clicking on an autofocus video tool element 350A in the selection bar 304, on which an "Autofocus" message appears when the cursor is hovering over. The operator may wish to use an image-based autofocus video tool because, for example, the operator can then select a broad region of interest such that focus can be achieved based on the entire broad region of interest, which may overcome waviness in the workpiece surface and give the best average focus for some desired inspection purposes.

As described above, however, operations associated with an image-based autofocus video tool are defined as user-initiated operations that include changing the Z height according to various embodiments of the present invention. Thus, the operator's addition of the image-based autofocus video tool automatically triggers the first set ("Type 1") of TAF automatic interrupt operations which, in various embodiments, turn off TAF and terminate TAF adjustments of the Z height and thereafter the TAF portion 1000 does not automatically resume Z height adjustments without a user-initiated instruction. As a result, an autofocus region of interest indicator 350B is shown in the color red in the field of view window 318, and also, a warning window 347 appears to notify the operator that "User initiated Z motion overrides TAF control. TAF will be turned off. This message will disappear in 5 seconds."

Figure 4E:
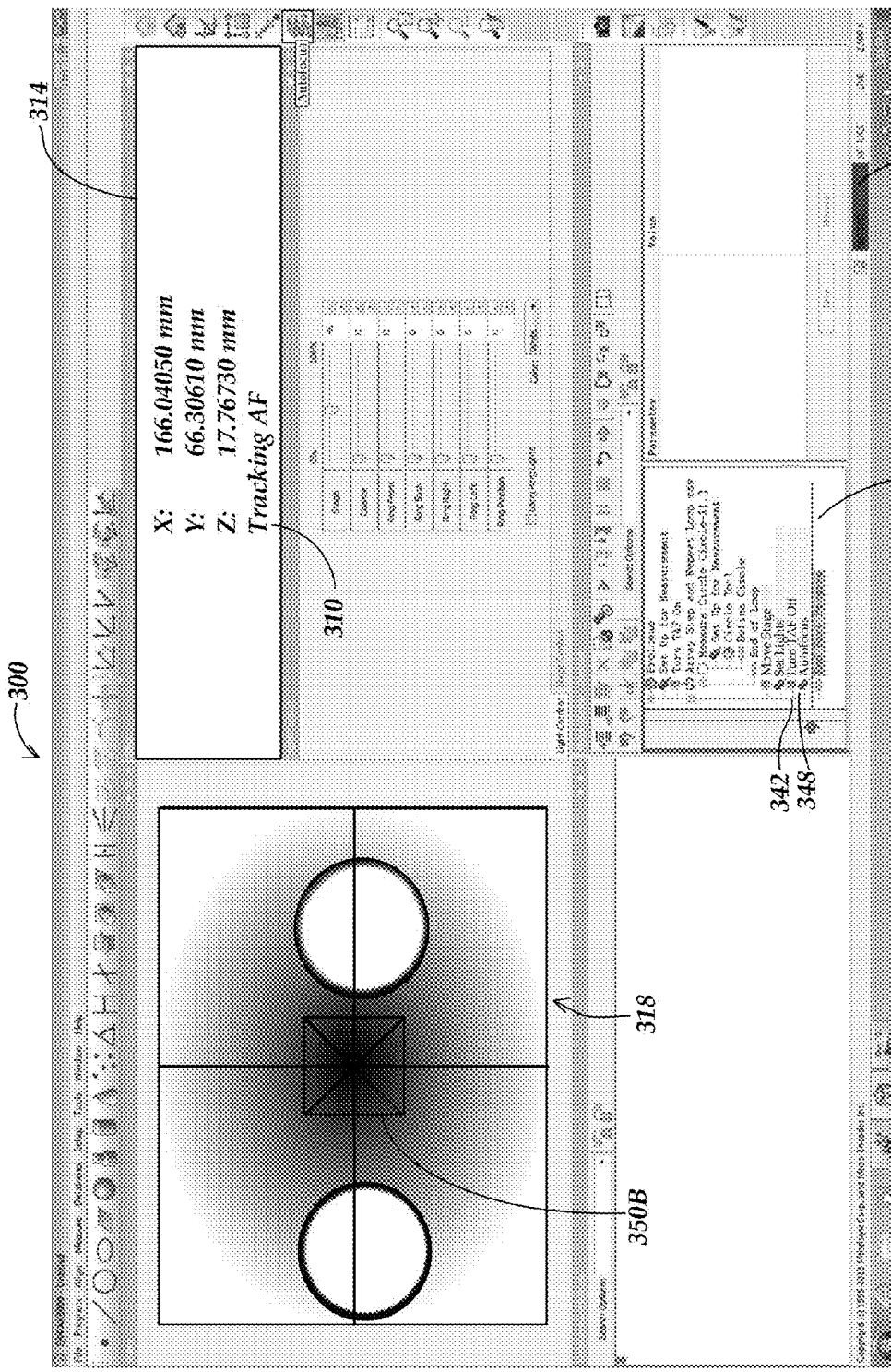

FIG. 4E shows the GUI 300, wherein the warning window 347 of FIG. 4D has expired, and the TAF portion 1000 has been turned off as a result of the operator's attempt to add an image-based autofocus video tool in FIG. 4D. That the TAF portion 1000 has been disabled is indicated by the "Tracking AF" message 310 now appearing in the color red, with no TAF deviation signal value appearing in the TAF deviation signal display 312. Because the TAF has been disabled, the operator is now allowed to add an image-based autofocus tool, as indicated by an "Autofocus" node 348 inserted in the part program editing window 322 and also by the autofocus region of interest indicator 350B now appearing in the color green in the field of view window 318.

At this time, in various embodiments of the present invention, the "Turn TAF Off" node 342 is automatically inserted before the "Autofocus" node 348 in the part program editing window 322, as shown in FIG. 4E. That is, during the learn mode of operation and when TAF is enabled, if an operator initiates one of the operations that include changing the Z height (e.g., operations to add an image-based autofocus tool), the part program editing window 322 displays: (i) an instruction representation corresponding to terminating TAF adjustments of the Z height in a manner consistent with the first set ("Type 1") of TAF automatic interrupt operations (e.g., the "Turn TAF Off" node 342) and (ii) an instruction representation corresponding to the user-initiated one of the operations that include changing the Z height (e.g., the "Autofocus" node 348). This feature may be desirable for the purpose of preemptively turning off (disabling) TAF before proceeding to execute user-initiated operations that include changing the Z height, as opposed to having the user-initiated operations that include changing the Z height automatically trigger the TAF off/disabled mode.

Figure 4F:
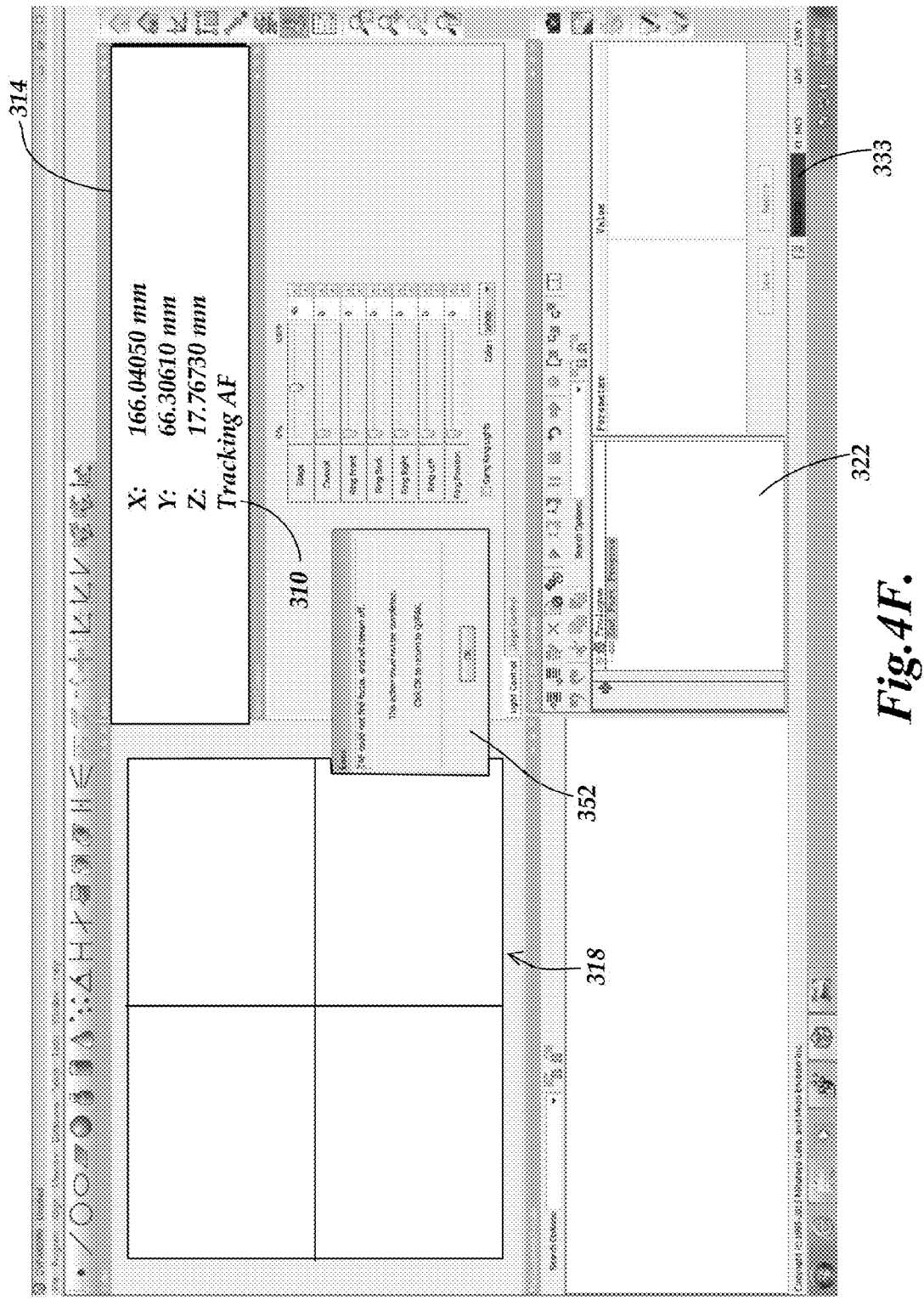

FIG. 4F shows the GUI 300, wherein during the learn mode of operation and when TAF is disabled, the operator attempts to turn back on TAF but the TAF portion 1000 cannot find a track-able surface within its focus range or focus limits. As a result, instead of dumbly following the user command to insert a "Turn TAF On" node, which would not properly function, the part program editing window 322 does not insert either the "Set Up for Measurement" node (326 in FIG. 4A) nor the "Turn TAF On" node (328 in FIG. 4A). At this time, the GUI 300 may provide an error message 352 to indicate that "TAF could not find focus, and will remain off." That TAF remains off (disabled) is indicated by the "Tracking AF" message 310 appearing in the color red. In response to the error message 352, the operator would move the workpiece stage 210 such that a workpiece surface comes within the TAF portion 1000's focus range or focus limits, and thereafter attempt to turn back on TAF.

In accordance with further embodiments of the present invention, a computer-readable non-transitory medium is provided, which includes computer-executable instructions configured to be loaded onto a computer to control a machine vision inspection system 100. The machine vision inspection system 100 includes an imaging portion 205; a movable stage 210 for holding one or more workpieces in a field of view of the imaging portion 205; and a Tracking AutoFocus (TAF) portion 1000 that operates to automatically adjust a focus position of the imaging portion 205 to focus at a Z height corresponding to a current surface height 1016 of the workpiece in the field of view. The TAF portion includes a focus sensor 1012 and a motion control portion 1014 that is responsive to a focus signal derived from the focus sensor 1012 to focus the imaging portion 205 at the Z height corresponding to the current surface height, when TAF is enabled. The machine vision inspection system further includes a graphical user interface (GUI) 300. The GUI under control of the computer-executable instructions operates to display instruction representations corresponding to TAF enable and disable operations in a part program editing window 322 including part program instruction representations displayed during learn mode operations of the machine vision inspection system. The TAF disable operations include a first set of TAF automatic interrupt operations that are automatically triggered by user-initiated operations that include changing the Z height.

In accordance with still further embodiments of the present invention, a machine vision inspection system 100 is provided including an imaging portion 205, a movable stage 210 for holding one or more workpieces in a field of view of the imaging portion, a control portion 120, and a Tracking AutoFocus (TAF) portion 1000 that operates to automatically adjust a focus position of the imaging portion 205 to focus at a Z height corresponding to a current surface height 1016 of the workpiece in the field of view. The TAF portion 1000 includes a focus sensor 1012 and a motion control portion 1014 that is responsive to a focus signal derived from the focus sensor 1012 to focus the imaging portion 205 at the Z height corresponding to the current surface height, when TAF is enabled. The machine vision inspection system 100 further includes a graphical user interface (GUI) 300. The control portion 120 of the machine vision inspection system 100 is configured to provide TAF enable and disable operations, wherein the TAF disable operations include a first set of TAF automatic interrupt operations that are automatically triggered by user-initiated operations that include changing the Z height.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for controlling operation of a Tracking AutoFocus (TAF) subsystem of a machine vision inspection system including an imaging portion, a movable stage for holding one or more workpieces in a field of view of the imaging portion, a controller, and graphical user interface (GUI), wherein the TAF subsystem comprises a combination of hardware and software configuration and operates to automatically adjust a focus position of the imaging portion along a Z direction to focus at a Z height corresponding to a current surface height of the workpiece in the field of view, the method comprising:
(A) providing the TAF subsystem, comprising a focus sensor and a motion controller that is responsive to a focus signal derived from the focus sensor to focus the imaging portion at the Z height corresponding to the current surface height as the imaging portion field of view traverses the workpiece along an X-Y direction transverse to the Z direction, when TAF is enabled;
(B) providing TAF enable and disable operations, wherein:
(B1) the TAF disable operations comprise a first set of TAF automatic interrupt operations that are automatically triggered by user-initiated operations that include changing the Z height, and
(B2) the TAF disable operations further comprise a second set of TAF automatic interrupt operations that are automatically triggered based on at least one respective TAF Z height surface tracking characteristic exceeding a previously set TAF disable limit for that respective TAF Z height surface tracking characteristic, as the imaging portion field of view traverses the workpiece along the X-Y direction transverse to the Z direction, wherein the TAF Z height surface tracking characteristic exceeding the previously set TAF disable limit corresponds to the imaging portion field of view abruptly traversing a large Z-height discontinuity or edge on the workpiece.

2. The method of claim 1, wherein the first set of TAF automatic interrupt operations comprises operations that terminate TAF adjustments of the Z height, wherein there are no conditions under which the TAF subsystem automatically resumes Z height adjustments without a user-initiated instruction which restarts TAF Z height control operations.

3. The method of claim 1, wherein the user-initiated operations that include changing the Z height comprise at least one of a) an explicit Z height adjustment operation and b) operations associated with an image-based autofocus video tool that is included in the machine vision inspection system.

4. The method of claim 1, wherein the method further comprises providing a TAF disable limit definition element in the GUI, operating the GUI to provide the TAF disable limit definition, and setting the previously set TAF disable limit based on the provided TAF disable limit definition.

5. The method of claim 1, wherein:
the at least one respective TAF Z height surface tracking characteristic comprises at least one of a) the Z height as controlled by the TAF subsystem, b) the rate of change of the Z height as a function of time, and c) the rate of change of the Z height as a function of distance along the X-Y direction, d) a surface tracking error comprising a difference between the current Z height at a current XY position and an indication of the required TAF focus Z height at the current XY position, and e) a TAF deviation signal that is indicative of a difference between the current Z height at a current XY position and the required TAF focus Z height at the current XY position, and
the previously set TAF disable limit for that TAF Z height surface tracking characteristic comprises at least one of f) an absolute Z height limit, g) a relative Z height limit defined relative to a current baseline Z height of the TAF subsystem, h) a limit on the rate of change of the Z height as a function of time, i) a limit on the rate of change of the Z height as a function of distance along an X-Y direction, j) a limit on the surface tracking error, and k) a limit on the TAF deviation signal.

6. The method of claim 5, wherein the current baseline Z height of the TAF subsystem is one of a) a fixed Z height defined for a current instance of TAF Z height adjustment operations, and b) an adaptively changing baseline Z height determined based on a set of recent Z heights as controlled by the TAF subsystem.

7. The method of claim 5, wherein the second set of TAF interrupt operations comprise a TAF holding mode that is automatically triggered, wherein the TAF holding mode includes discontinuing TAF adjustments of the Z height and further includes that if the at least one respective TAF Z height surface tracking characteristic returns below the previously set TAF disable limit for that respective TAF Z height surface tracking characteristic during the TAF holding mode, then TAF Z height adjustments are automatically resumed without a user-initiated instruction.

8. The method of claim 7, wherein when the TAF Z height adjustments are automatically resumed, the current baseline Z height is automatically set to a new value based on a current actual Z height.

9. The method of claim 8, wherein the new value of the current baseline Z height is based on the current actual Z height at the time of resuming plus a correction based on the TAF deviation signal, or is based on the current actual Z height at the time of resuming plus a correction based on the TAF adjustments of the Z height after resuming.

10. The method of claim 7, wherein the method further comprises providing a TAF status indication on the GUI, the TAF status indication indicating at least one of TAF enabled or on, TAF disabled or off, and TAF suspended or holding mode.

11. The method of claim 1, wherein the GUI comprises a part program editing window including part program instruction representations displayed during learn mode operations of the machine vision inspection system, and the method further comprises providing instruction representations corresponding to the TAF enable and disable operations.

12. The method of claim 11, wherein during the learn mode of operation and when TAF is disabled, when it is attempted to enable TAF at an (X,Y) position:
the TAF subsystem attempts to adjust the Z height at that (X,Y) position;
if the Z height is successfully adjusted by the TAF subsystem at a Z height Zadj, then in the part program editing window a set of TAF enable instruction representations are displayed that firstly position the machine vision inspection system at the position (X,Y, Zadj) and that secondly enable TAF operations at that position.

13. The method of claim 12, wherein during the learn mode of operation and when TAF is disabled, when it is attempted to enable TAF at an (X,Y) position:
the TAF subsystem attempts to adjust the Z height at that (X,Y) position;
if the Z height is not successfully adjusted by the TAF subsystem at that (X,Y) position, then the TAF enable attempt is cancelled and a set of TAF enable instruction representations are not displayed in the part program editing window.

14. The method of claim 11, wherein:
the user-initiated operations that include changing the Z height comprise at least one of a) an explicit Z height adjustment operation and b) operations associated with an image-based autofocus video tool that is included in the machine vision inspection system;
the first set of TAF automatic interrupt operations comprises operations that terminate TAF adjustments of the Z height, wherein there are no conditions under which the TAF subsystem automatically resumes Z height adjustments without a user-initiated instruction which restarts TAF Z height control operations; and
during the learn mode of operation and when TAF is enabled, when user initiates one of the operations that include changing the Z height, then displaying in the part program editing window: (i) an instruction representation corresponding to terminating TAF adjustments of the Z height in a manner consistent with the first set of TAF automatic interrupt operations, and (ii) an instruction representation corresponding to the user-initiated one of the operations that include changing the Z height.

15. A computer-readable non-transitory medium including computer-executable instructions, which are configured to be loaded onto a computer to control a machine vision inspection system including an imaging portion; a movable stage for holding one or more workpieces in a field of view of the imaging portion; a Tracking AutoFocus (TAF) subsystem that comprises a combination of hardware and software configuration and operates to automatically adjust a focus position of the imaging portion to focus at a Z height corresponding to a current surface height of the workpiece in the field of view, the TAF subsystem comprising a focus sensor and a motion controller that is responsive to a focus signal derived from the focus sensor to focus the imaging portion at the Z height corresponding to the current surface height as the imaging portion field of view traverses the workpiece along an X-Y direction transverse to the Z direction, when TAF is enabled; and a graphical user interface (GUI), the GUI under control of the computer-executable instructions being configured to:
display instruction representations corresponding to TAF enable and disable operations in a part program editing window including part program instruction representations displayed during learn mode operations of the machine vision inspection system,
wherein the TAF disable operations comprise: i) a first set of TAF automatic interrupt operations that are automatically triggered by user-initiated operations that include changing the Z height, and ii) a second set of TAF automatic interrupt operations that are automatically triggered based on at least one respective TAF Z height surface tracking characteristic exceeding a previously set TAF disable limit for that respective TAF Z height surface tracking characteristic, as the imaging portion field of view traverses the workpiece along the X-Y direction transverse to the Z direction, wherein the TAF Z height surface tracking characteristic exceeding the previously set TAF disable limit corresponds to the imaging portion field of view abruptly traversing a large Z-height discontinuity or edge on the workpiece.

16. The computer-readable non-transitory medium of claim 15, wherein during the learn mode of operation and when TAF is disabled, when it is attempted to enable TAF at an (X,Y) position, the TAF subsystem attempts to adjust the Z height at that (X,Y) position, and
if the Z height is successfully adjusted by the TAF subsystem at a Z height Zadj, then the GUI displays in the part program editing window a set of TAF enable instruction representations that firstly position the machine vision inspection system at the position (X,Y, Zadj) and that secondly enable TAF operations at that position.

17. The computer-readable non-transitory medium of claim 15, wherein:
the user-initiated operations that include changing the Z height comprise at least one of a) an explicit Z height adjustment operation and b) operations associated with an image-based autofocus video tool that is included in the machine vision inspection system;
the first set of TAF automatic interrupt operations comprises operations that terminate TAF adjustments of the Z height, wherein there are no conditions under which the TAF subsystem automatically resumes Z height adjustments without a user-initiated instruction which restarts TAF Z height control operations; and
during the learn mode of operation and when TAF is enabled, when user initiates one of the operations that include changing the Z height, then the GUI displays in the part program editing window: (i) an instruction representation corresponding to terminating TAF adjustments of the Z height in a manner consistent with the first set of TAF automatic interrupt operations, and (ii) an instruction representation corresponding to the user-initiated one of the operations that include changing the Z height.

18. The computer-readable non-transitory medium of claim 15,
wherein the GUI is further configured to display a TAF disable limit definition element that operates to define the previously set TAF disable limit.

19. The computer-readable non-transitory medium of claim 18, wherein the previously set TAF disable limit comprises i) a positive relative Z height limit defined relative to a current baseline Z height of the TAF subsystem to indicate a rising surface, and ii) a negative relative Z height limit defined relative to the current baseline Z height of the TAF subsystem to indicate a falling surface.

20. The computer-readable non-transitory medium of claim 15,
wherein the GUI is further configured to display a TAF status indication indicating at least one of TAF enabled or on, TAF disabled or off, and TAF suspended or holding mode.

21. The computer-readable non-transitory medium of claim 15,
wherein the GUI is further configured to display a TAF enable/disable selection element operable to receive user input to turn on/off the TAF subsystem.

22. A machine vision inspection system including an imaging portion, a movable stage for holding one or more workpieces in a field of view of the imaging portion, a controller, a Tracking AutoFocus (TAF) subsystem that comprises a combination of hardware and software configuration and operates to automatically adjust a focus position of the imaging portion to focus at a Z height corresponding to a current surface height of the workpiece in the field of view, the TAF subsystem comprising a focus sensor and a motion controller that is responsive to a focus signal derived from the focus sensor to focus the imaging portion at the Z height corresponding to the current surface height as the imaging portion field of view traverses the workpiece along an X-Y direction transverse to the Z direction, when TAF is enabled; and a graphical user interface (GUI), wherein the controller is configured to:
provide TAF enable and disable operations,
wherein:
the TAF disable operations comprise: i) a first set of TAF automatic interrupt operations that are automatically triggered by user-initiated operations that include changing the Z height, and ii) a second set of TAF automatic interrupt operations that are automatically triggered based on at least one respective TAF Z height surface tracking characteristic exceeding a previously set TAF disable limit for that respective TAF Z height surface tracking characteristic, as the imaging portion field of view traverses the workpiece along the X-Y direction transverse to the Z direction, wherein the TAF Z height surface tracking characteristic exceeding the previously set TAF disable limit corresponds to the imaging portion field of view abruptly traversing a large Z-height discontinuity or edge on the workpiece.

23. The system of claim 22, wherein the GUI comprises a part program editing window including part program instruction representations displayed during learn mode operations of the machine vision inspection system, and during the learn mode of operation and when TAF is disabled, when it is attempted to enable TAF at an (X,Y) position;
the TAF subsystem attempts to adjust the Z height at that (X,Y) position;
if the Z height is successfully adjusted by the TAF subsystem at a Z height Zadj, then the GUI displays in the part program editing window a set of TAF enable instruction representations that firstly position the machine vision inspection system at the position (X,Y, Zadj) and that secondly enable TAF operations at that position.

24. The system of claim 22, wherein:
the user-initiated operations that include changing the Z height comprise at least one of a) an explicit Z height adjustment operation and b) operations associated with an image-based autofocus video tool that is included in the machine vision inspection system;
the first set of TAF automatic interrupt operations comprises operations that terminate TAF adjustments of the Z height, wherein there are no conditions under which the TAF subsystem automatically resumes Z height adjustments without a user-initiated instruction which restarts TAF Z height control operations; and
the GUI comprises a part program editing window including part program instruction representations displayed during learn mode operations of the machine vision inspection system, and during the learn mode of operation and when TAF is enabled, when user initiates one of the operations that include changing the Z height, then the GUI displays in the part program editing window: (i) an instruction representation corresponding to terminating TAF adjustments of the Z height in a manner consistent with the first set of TAF automatic interrupt operations, and (ii) an instruction representation corresponding to the user-initiated one of the operations that include changing the Z height.

* * * * *